United States Patent
Funada et al.

(10) Patent No.: US 8,340,816 B2
(45) Date of Patent: Dec. 25, 2012

(54) USER PREFERENCE INFERRING APPARATUS, USER PROFILE INFERRING APPARATUS, AND ROBOT

(75) Inventors: Jun-ichi Funada, Tokyo (JP); Shin Ishiguro, Tokyo (JP)

(73) Assignee: NEC Corporation, Tokyo (JP)

( * ) Notice: Subject to any disclaimer, the term of this patent is extended or adjusted under 35 U.S.C. 154(b) by 957 days.

(21) Appl. No.: 11/569,222

(22) PCT Filed: May 19, 2005

(86) PCT No.: PCT/JP2005/009134
§ 371 (c)(1),
(2), (4) Date: Nov. 16, 2006

(87) PCT Pub. No.: WO2005/111881
PCT Pub. Date: Nov. 24, 2005

(65) Prior Publication Data
US 2008/0234862 A1    Sep. 25, 2008

(30) Foreign Application Priority Data
May 19, 2004    (JP) ................................ 2004-149325

(51) Int. Cl.
*G06Q 30/00* (2012.01)
(52) U.S. Cl. .................. 700/245; 705/14.49; 705/14.52; 705/14.53; 705/14.66; 705/14.67; 235/462.01; 235/462.43
(58) Field of Classification Search .................. 700/245; 235/462.01, 462.43, 462.45; 705/14.49, 705/14.5, 14.51, 14.52, 14.53, 14.54, 14.55, 705/14.56, 14.66, 14.67
See application file for complete search history.

(56) References Cited

U.S. PATENT DOCUMENTS

| 6,960,986 B2 | 11/2005 | Asama et al. |
| 6,967,577 B2 * | 11/2005 | Taylor et al. ................ 340/572.1 |
| 7,136,826 B2 * | 11/2006 | Alsafadi et al. .............. 705/7.11 |

(Continued)

FOREIGN PATENT DOCUMENTS

JP    823292 A    1/1996

(Continued)

OTHER PUBLICATIONS

Office Action issued Sep. 20, 2011 from the Japanese Patent Office in counterpart Japanese application No. 2006-513629.

(Continued)

*Primary Examiner* — Thomas Black
*Assistant Examiner* — Peter D Nolan
(74) *Attorney, Agent, or Firm* — Sughrue Mion, PLLC

(57) ABSTRACT

An object of the present invention is to infer a user's preference or profile with a good precision.
A user preference inferring apparatus 100 includes a receiving means 2 which receives information related to an article from a tag attached to the article, an article name determining means 3 obtaining an article name of the article on the basis of the information related to the article received by the receiving means 2, and a preference determining means 4 which infers a user's preference on the basis of the information related to the article received by the receiving means 2. On the basis of the article name obtained by the article name determining means 3, the preference determining means 4 obtains preference information corresponding to the article name from a database that stores the article name and the preference information corresponding to the article name, and determines the user's preference.

18 Claims, 30 Drawing Sheets

U.S. PATENT DOCUMENTS

| | | | |
|---|---|---|---|
| 7,147,154 B2 * | 12/2006 | Myers et al. | 235/383 |
| 7,168,618 B2 * | 1/2007 | Schwartz | 235/383 |
| 7,180,422 B2 * | 2/2007 | Milenkovic et al. | 340/572.4 |
| 2002/0081937 A1 * | 6/2002 | Yamada et al. | 446/175 |
| 2002/0129361 A1 | 9/2002 | Arita et al. | |
| 2002/0147629 A1 * | 10/2002 | Alsafadi et al. | 705/10 |
| 2002/0184107 A1 | 12/2002 | Tsuda et al. | |
| 2003/0105682 A1 * | 6/2003 | Dicker et al. | 705/27 |
| 2005/0149392 A1 * | 7/2005 | Gold et al. | 705/14 |

FOREIGN PATENT DOCUMENTS

| | | |
|---|---|---|
| JP | 11212996 A | 8/1998 |
| JP | 2000-339322 A | 12/2000 |
| JP | 2001-043241 A | 2/2001 |
| JP | 2001195430 A | 7/2001 |
| JP | 2001320781 A | 11/2001 |
| JP | 2002127059 A | 5/2002 |
| JP | 2002176593 A | 6/2002 |
| JP | 2002269457 A | 9/2002 |
| JP | 2002318966 A | 10/2002 |
| JP | 2003-178094 A | 6/2003 |
| JP | 200417200 A | 1/2004 |
| JP | 2004-534296 A | 11/2004 |
| WO | WO 02/082365 A2 | 10/2002 |
| WO | WO 02052365 A2 | 10/2002 |
| WO | WO 02082365 A2 | 10/2002 |

OTHER PUBLICATIONS

Japanese Office Action dated Jun. 12, 2012 issued by the Japanese Patent Office in counterpart Japanese Application No. 2006-513629.

Shimada, Daisuke, et al. "Build a support system for care person by using active camera", The Institute of Electronics, Information and Communication Engineers, Technical Report of IEICE, vol. 101, No. 524, pp. 64-70.

* cited by examiner

FIG. 2

| HOBBY | ARTICLE NAME | | | |
|---|---|---|---|---|
| FISHING | FISHING ROD a OF A COMPANY | FISHING ROD b OF A COMPANY | BOOK OF B COMPANY "INTRODUCTION TO FISHING" | ... |
| LISTENING TO CLASSIC MUSIC | BEETHOVEN COMPILATION OF C COMPANY | MOZART COMPILATION OF C COMPANY | BACH COMPILATION OF D COMPANY | ... |
| SKIING | SKI BOARD a OF E COMPANY | SKI BOARD b OF E COMPANY | SKI SHOES a OF E COMPANY | ... |
| OVERSEAS TRAVELLING | GUIDEBOOK a OF F COMPANY | GUIDEBOOK b OF F COMPANY | GUIDEBOOK c OF F COMPANY | ... |
| ... | ... | ... | ... | ... |

| HOBBY | ARTICLE DATA | | | | | | |
|---|---|---|---|---|---|---|---|
| | ARTICLE NAME | WEIGHT | ARTICLE NAME | WEIGHT | ARTICLE NAME | WEIGHT | |
| FISHING | FISHING ROD a OF A COMPANY | 15 | FISHING ROD b OF A COMPANY | 15 | BOOK OF B COMPANY "INTRODUCTION TO FISHING" | 10 | ... |
| LISTENING TO CLASSIC MUSIC | BEETHOVEN COMPILATION OF C COMPANY | 3 | MOZART COMPILATION OF C COMPANY | 3 | BACH COMPILATION OF D COMPANY | 1 | ... |
| SKIING | SKI BOARD a OF E COMPANY | 13 | SKI BOARD b OF E COMPANY | 13 | SKI SHOES a OF E COMPANY | 12 | ... |
| OVERSEAS TRAVELLING | GUIDEBOOK a OF F COMPANY | 5 | GUIDEBOOK b OF F COMPANY | 5 | GUIDEBOOK c OF F COMPANY | 6 | ... |
| ... | ... | ... | ... | ... | ... | ... | ... |

| HOBBY | ARTICLE CATEGORY NAME | | | |
|---|---|---|---|---|
| FISHING | FISHING ROD | BOOK ON FISHING | REEL | ... |
| LISTENING TO CLASSIC MUSIC | CD OF CLASSIC MUSIC | BOOK ON CLASSIC MUSIC | STEREO APPLIANCE | ... |
| SKIING | SKI BOARD | SKI WEAR | SKI SHOES | ... |
| OVERSEAS TRAVELLING | OVERSEAS TRAVELLING GUIDEBOOK | SUITCASE FOR TRAVELLING | TRANCE FOR TRAVELLING | ... |
| .. | .. | .. | .. | .. |

FIG. 12

| HOBBY | ARTICLE DATA | | | | | | |
|---|---|---|---|---|---|---|---|
| | ARTICLE CATEGORY NAME | WEIGHT | ARTICLE CATEGORY NAME | WEIGHT | ARTICLE CATEGORY NAME | WEIGHT | |
| FISHING | FISHING ROD | 15 | BOOK ON FISHING | 8 | REEL | 15 | ... |
| LISTENING TO CLASSIC MUSIC | CD OF CLASSIC MUSIC | 3 | BOOK ON CLASSIC MUSIC | 3 | STEREO APPLIANCE | 3 | ... |
| SKIING | SKI BOARD | 13 | SKI WEAR | 13 | SKI SHOES | 13 | ... |
| OVERSEAS TRAVELLING | OVERSEAS TRAVELLING GUIDEBOOK | 5 | SUITCASE FOR TRAVELLING | 5 | TRANCE FOR TRAVELLING | 5 | ... |
| ... | ... | ... | ... | ... | ... | ... | |

| OWNER INFORMATION | HOBBY | NUMBER OF READ-OUT TIMES |
|---|---|---|
| P[0] | FISHING | 2 |
| | OVERSEAS TRAVELLING | 6 |
| | : | : |
| P[1] | SKIING | 1 |
| | : | : |
| : | : | : |

~19

_US 8,340,816 B2_

USER PREFERENCE INFERRING APPARATUS, USER PROFILE INFERRING APPARATUS, AND ROBOT

This application claims priority from PCT Application No. PCT/JP2005/009134 filed May 19, 2005, and from Japanese Patent Application No. 2004-149325 filed May 19, 2004, which applications are incorporated herein by reference.

TECHNICAL FIELD

The present invention relates to a user preference inferring apparatus, a user preference inferring method, a user profile inferring apparatus, a user profile inferring method, and a robot.

BACKGROUND ART

Conventionally, as a method for inferring a user's hobby with a system, there has been one in which a hobby is inferred from the result of the user's web access, as disclosed in the patent document 1, for example.

Such a technique is used so that the system may behave more appropriately to the user in order to improve the user's degree of satisfaction or to present suitable information to the user by grasping the user's hobby.

For example, with a robot that is used in a general home or the like, if the robot can grasp the user's circumstance such as the user's hobby or preference, the robot can speak or behave in accordance therewith. This can realize a more enjoyable robot or present a suitable advertisement in accordance with the user's hobby or preference.

[Patent Document 1] Japanese Laid-open patent publication No. 2000-339322

DISCLOSURE OF THE INVENTION

However, the conventional technique has had a problem in that, because the information usable for inference of a hobby is restrictive, the inference cannot be made with a good precision. By a method of inferring a hobby from the result of Web access as disclosed in the patent document 1, the hobby is inferred only from the record of the user's Web access with a personal computer, a portable phone, or the like. However, since the time or object by which the user actually makes Web access is restrictive, it has been difficult to obtain an inference result with a good precision even if the user's hobby is inferred from such restrictive information.

An object of the present invention is to provide a technique of inferring a user's preference or profile with a good precision.

According to the present invention, there is provided a user preference inferring apparatus including: a receiving unit which receives information related to an article from a tag attached to the article; and a preference determining unit which infers a user's preference on the basis of the information related to the article received by the receiving unit.

The user preference inferring apparatus of the present invention may further include an article name obtaining unit which obtains an article name of the article on the basis of the information related to the article received by the receiving unit, wherein, on the basis of the article name obtained by the article name obtaining unit, the preference determining unit may obtain preference information corresponding to the article name from a database that stores the article name and the preference information corresponding to the article name.

The user preference inferring apparatus of the present invention may further include an article name obtaining unit which obtains an article name of the article on the basis of the information related to the article received by the receiving unit, and an article category obtaining unit which obtains, on the basis of the article name obtained by the article name obtaining unit, a category corresponding to the article name from a database that stores the article name and the category corresponding to the article name, wherein, on the basis of the category obtained by the article category obtaining unit, the preference determining unit may obtain preference information corresponding to the category from a database that stores the category and the preference information corresponding to the category.

The user preference inferring apparatus of the present invention may further include a threshold value storing unit which stores a threshold value for inferring the user's preference, wherein the preference determining unit may infer the user's preference on the basis of comparison between an accumulated sum of the preference information obtained from the database and the threshold value.

In the user preference inferring apparatus of the present invention, the preference determining unit may obtain a weighting coefficient defined for each article together with the preference information from the database, and the preference determining unit may calculate the accumulated sum considering also the weighting coefficient, and infers the user's preference on the basis of comparison between the accumulated sum and the threshold value.

In the user preference inferring apparatus of the present invention, the preference determining unit may further include an owner inferring unit which infers, for each article, an owner of the article and, for each owner inferred by the owner inferring unit, the preference determining unit may infer the preference of the owner.

The user preference inferring apparatus of the present invention may further include a presentation processing unit which presents information to the user, and an input receiving unit which receives input of information from the user, wherein the owner inferring unit may infer the owner of the article by presenting information that inquires to the presentation processing unit on the owner and by receiving a reply to the inquiring information via the input receiving unit.

The user preference inferring apparatus of the present invention may further include a clustering processing unit which clusters, according to a predetermined standard, a plurality of the articles on which the receiving unit has received information related to the articles, wherein the preference determining unit may infer, for each cluster divided by the clustering processing unit, the preference of the owner of the articles contained in the cluster.

The user preference inferring apparatus of the present invention may further include a position information obtaining unit which obtains position information of a plurality of the articles on which the receiving unit has read out information identifying the articles, wherein the clustering processing unit may cluster the articles in accordance with relative position among the articles on the basis of the position information of the articles obtained by the position information obtaining unit.

In the user preference inferring apparatus of the present invention, the information related to the articles may be information identifying the articles.

The user preference inferring apparatus of the present invention may further include a presentation processing unit which presents information to the user, and an input receiving unit which receives input of information from the user, wherein the preference determining unit may determine the user's preference by allowing the presentation processing unit to present candidates of determination results and allowing the input receiving unit to receive selection of a correct determination result from among the candidates of determination results.

The user preference inferring apparatus of the present invention may further include a moving unit for moving spontaneously.

According to the present invention, there is provided a robot that moves spontaneously, including a user preference inferring apparatus as set forth in any one of claims 1 to 11; a moving unit that moves the user preference inferring apparatus; and an operation controlling unit controlling the moving unit.

According to the present invention, there is provided a robot including a user preference inferring apparatus as set forth in any of the above; and an operation controlling unit that operates to the user on the basis of the user's preference inferred by the user preference inferring apparatus.

According to the present invention, there is provided a user profile inferring apparatus including an information obtaining unit which obtains information related to an article from a tag attached to the article; and a profile inferring unit which infers a user's profile on the basis of the information related to the article read out by the information obtaining unit.

The user profile inferring apparatus of the present invention may further include an owner inferring unit which infers, for each article, an owner of the article, wherein, for each owner inferred by the owner inferring unit, the profile inferring unit may infer the profile of the owner.

The user profile inferring apparatus of the present invention may further include a position information obtaining unit which obtains position information of the article on which the information obtaining unit has read out information related to the article, wherein the owner inferring unit may infer the owner of the article in accordance with relative position among articles on the basis of the position information of the article obtained by the position information obtaining unit.

The user profile inferring apparatus of the present invention may further include a history storing unit which stores the time at which the information obtaining unit has obtained information related to the article in correspondence with information showing the article, wherein the profile inferring unit may infer the user's profile on the basis of the information showing the article and the time corresponding thereto stored by the history storing unit.

According to the present invention, there is provided a robot that moves spontaneously, including a user profile inferring apparatus as set forth in any of the above; a moving unit that moves the user profile inferring apparatus; and an operation controlling unit that controls the moving unit.

According to the present invention, there is provided a robot including a user profile inferring apparatus as set forth in any of the above; and an operation controlling unit that operates to the user on the basis of the user's profile inferred by the user profile inferring apparatus.

According to the present invention, there is provided a user preference inferring method including receiving information related to an article from a tag attached to the article; and inferring a user's preference on the basis of the information related to the article received in the receiving information related to the article.

The user preference inferring method of the present invention may further include obtaining an article name of the article on the basis of the information related to the article received in the receiving information related to the article, wherein, on the basis of the article name obtained in the obtaining the article name, the inferring the user's preference may include obtaining preference information corresponding to the article name from a database that stores the article name and the preference information corresponding to the article name.

According to the present invention, there is provided a user profile inferring method including obtaining information related to an article from a tag attached to the article; and inferring a user's profile on the basis of the information related to the article that obtained in the obtaining information related to the article.

According to the present invention, there is provided a user preference inferring program that allows a computer to function as receiving means for receiving information related to an article from a tag attached to the article; and preference determining means for inferring a user's preference on the basis of the information related to the article received by the receiving means.

According to the present invention, there is provided a robot controlling program that allows a robot having a moving unit to move spontaneously by allowing a computer contained in the robot to function as receiving means for receiving information related to an article from a tag attached to the article; preference determining means for inferring a user's preference on the basis of the information related to said article received by said receiving means; and operation controlling means for controlling said moving unit.

According to the present invention, a user's preference or profile is inferred on the basis of the articles owned by the user, so that the user's preference or profile can be inferred with a good precision. Also, a plurality of articles are classified on the basis of information such as the owner of the article or the spatial position of the article, and the hobby is inferred for each set. Therefore, even if a plurality of articles owned by a plurality of owners are present, the preference or profile of each constituent member can be inferred with a good precision.

Further, according to the present invention, tag information attached in advance to articles located in the surroundings of the user, such as the articles located in the house of the user, is read out, and the user's hobby is inferred on the basis of the information. This eliminates the need for the user to input hobbies or the like directly into the system, thereby alleviating the burden imposed upon the user.

BRIEF DESCRIPTION OF THE DRAWINGS

The aforementioned objects as well as other objects, features, and advantages will become more apparent by preferable embodiments described below and the following drawings associated therewith.

FIG. 2 is a view showing one example of an internal structure of a preference information database.

FIG. 6 is a view showing another example of an internal structure of a preference information database.

FIG. 10 is a view showing one example of an internal structure of a preference information database according to an embodiment of the present invention.

FIG. 12 is a view showing another example of an internal structure of a preference information database.

FIG. 24 is a view showing one example of an internal structure of a read-out result storing unit according to an embodiment of the present invention.

BEST MODES FOR CARRYING OUT THE INVENTION

Next, embodiments according to the present invention will be described in detail with reference to the attached drawings.

In the following embodiments, similar constituent elements will be denoted with similar symbols, and the description thereof will not be repeated.

First Embodiment

Figure 1:
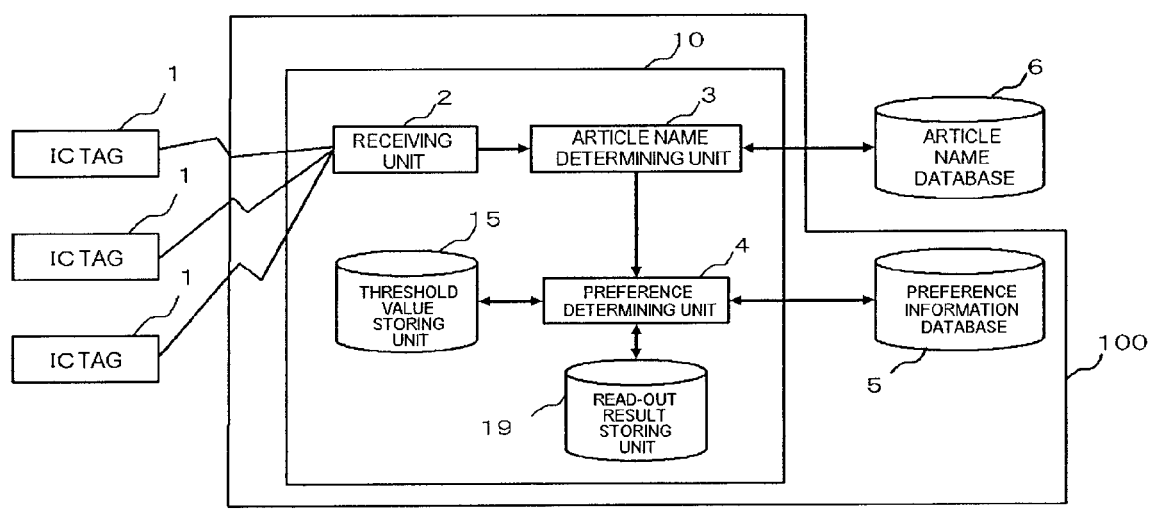
FIG. 1 is a block diagram showing a structure of a user preference inferring apparatus according to an embodiment of the present invention.

FIG. 1 is a block diagram showing a structure of a user preference inferring apparatus according to the present embodiment.

In the present embodiment, IC tags 1 are attached to articles placed in a room. An IC tag 1 may be an apparatus generating a wave that mediates information such as electromagnetic wave or a sonic wave, such as an RFID (Radio Frequency Identification) tag, a supersonic wave tag, or an IR (Infra-Red) tag. The IC tag 1 stores at least the information that uniquely specifies the article to which the IC tag 1 is attached, and transmits the information via electromagnetic wave (including electric wave and light), sonic wave, or the like.

A user preference inferring apparatus 100 is constructed with an operating means 10 and a preference information database 5. The operating means 10 includes a receiving means 2 (receiving unit), an article name determining means 3 (article name obtaining unit), a preference determining means 4 (preference determining unit), a threshold value storing unit 15, and a read-out result storing unit 19. The operating means 10 steers the functions operated by a CPU of a computer or the like.

The receiving means 2 includes an antenna for receiving information from the IC tag 1 and an electric circuit or the like for driving thereof and signal analysis.

An article name database 6 holds a table in which the tag information stored in the IC tag 1 and the article name are arranged in correspondence. The article name determining means 3 searches into the article name database 6 on the basis of the tag information that the receiving means 2 has obtained from the IC tag 1, and obtains the article name corresponding to the tag information.

Although not illustrated here, in the present embodiment, the user preference inferring apparatus 100 has a communication controlling function that transmits and receives data to and from other terminals via a network such as the Internet. The article name database 6 is stored, for example, in a Web server connected to the Internet. The article name determining means 3 obtains the article name from the article name database 6 via the network.

The article name determining means 3 notifies the preference determining means 4 of the article name obtained from the article name database 6. The preference information database 5 holds the information that can determine the preference at least on the basis of the article name.

FIG. 2 is a view showing one example of an internal structure of the preference information database 5.

The preference information database 5 includes a hobby column and an article name column that stores an article name of an article that forms a standard for determining that the user has the hobby. Here, the hobby column stores, for example, "fishing", "listening to classic music", "skiing", and "overseas traveling". For example, in the article name column corresponding to "fishing" in the hobby column, "fishing rod a of A company", "fishing rod b of A company", and "book of B company, "Introduction to fishing"" are stored.

Returning to FIG. 1, the preference determining means 4 determines the preference of the user by making reference to the preference information database 5. For example, when the user owns the "fishing rod a of A company", "fishing rod b of A company", or the like, the preference determining means 4 can determine that the hobby of the user is "fishing".

The threshold value storing unit 15 stores a threshold value that the preference determining means 4 makes reference to in determining the hobby of the user. On the basis of the article name that the article name determining means 3 has obtained, the preference determining means 4 reads out the hobby corresponding to the article name from the preference information database 5. Every time the preference determining means 4 reads out a hobby from the preference information database 5, the preference determining means 4 stores the result thereof in the read-out result storing unit 19.

Figure 3:
FIG. 3 is a view showing one example of an internal structure of a read-out result storing unit.

FIG. 3 is a view showing one example of an internal structure of the read-out result storing unit 19.

The read-out result storing unit 19 includes a hobby column and a number-of-read-out-times column that stores the number of times that the preference determining means 4 has read out the hobby from the preference information database 5. Every time the preference determining means 4 reads out a hobby from the preference information database 5, the preference determining means 4 increments the number in the number-of-read-out-times column corresponding to the hobby in the read-out result storing unit 19.

Returning to FIG. 1, after finishing the reading-out process, the preference determining means 4 makes reference to the read-out result storing unit 19 and the threshold value storing unit 15 and, when the number of read-out times for any of the hobbies is equal to or larger than the threshold value stored in the threshold value storing unit 15, the preference determining means 4 determines that the hobby is a hobby of the user. When the number of read-out times for all of the hobbies is lower than the threshold value, the preference determining means 4 may determine that the reliability of determination is low and stop outputting the determination result. The preference determining means 4 outputs a determination result. The preference determining means 4 can output the determination result, for example, to other constituent elements contained in the user preference inferring apparatus 100, and can also output the determination result to an external apparatus of the user preference inferring apparatus 100.

Figure 4:
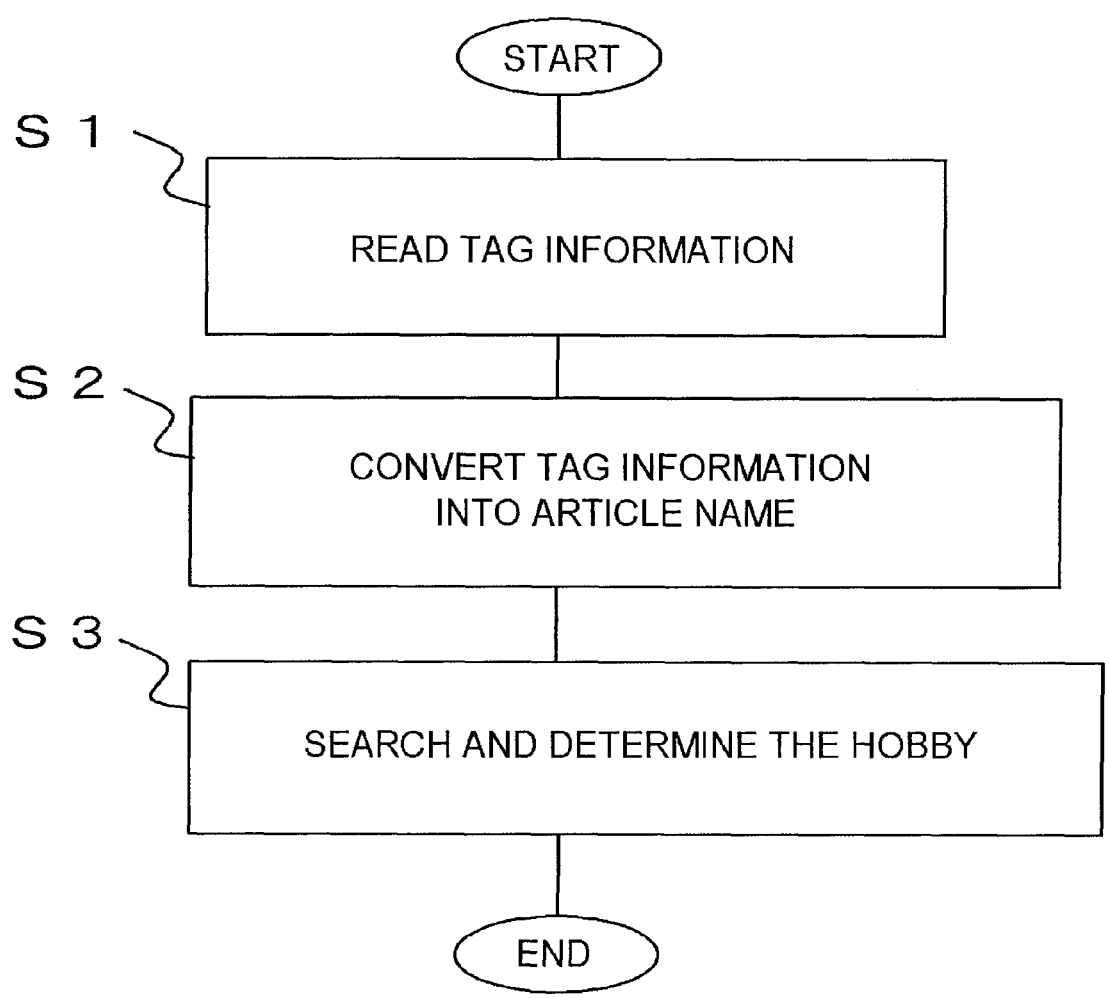
FIG. 4 is a flowchart showing a processing procedure of the user preference inferring apparatus shown in FIG. 1.

FIG. 4 is a flowchart showing a processing procedure of the user preference inferring apparatus 100 shown in FIG. 1.

First, the receiving means 2 reads tag information from an IC tag 1 located in the surroundings (step S1). At this time, the receiving means 2 can read tag information of one IC tag 1, or can read tag information of a plurality of IC tags 1. Subsequently, on the basis of the tag information that the receiving means 2 has read, the article name determining means 3 searches into the article name database 6, and obtains a corresponding article name (step S2). Thereafter, the article name determining means 3 notifies the preference determining means 4 of the obtained article name.

In the step S2, for example, when the information written on the IC tag 1 is a number attached to a product, the article name determining means 3 can make access to the article name database 6 via a network using the number as a search key, so as to obtain a concrete product name corresponding to the number.

Subsequently, the preference determining means 4 searches into the preference information database 5 and determines the preference of the user (step S3).

Figure 5:
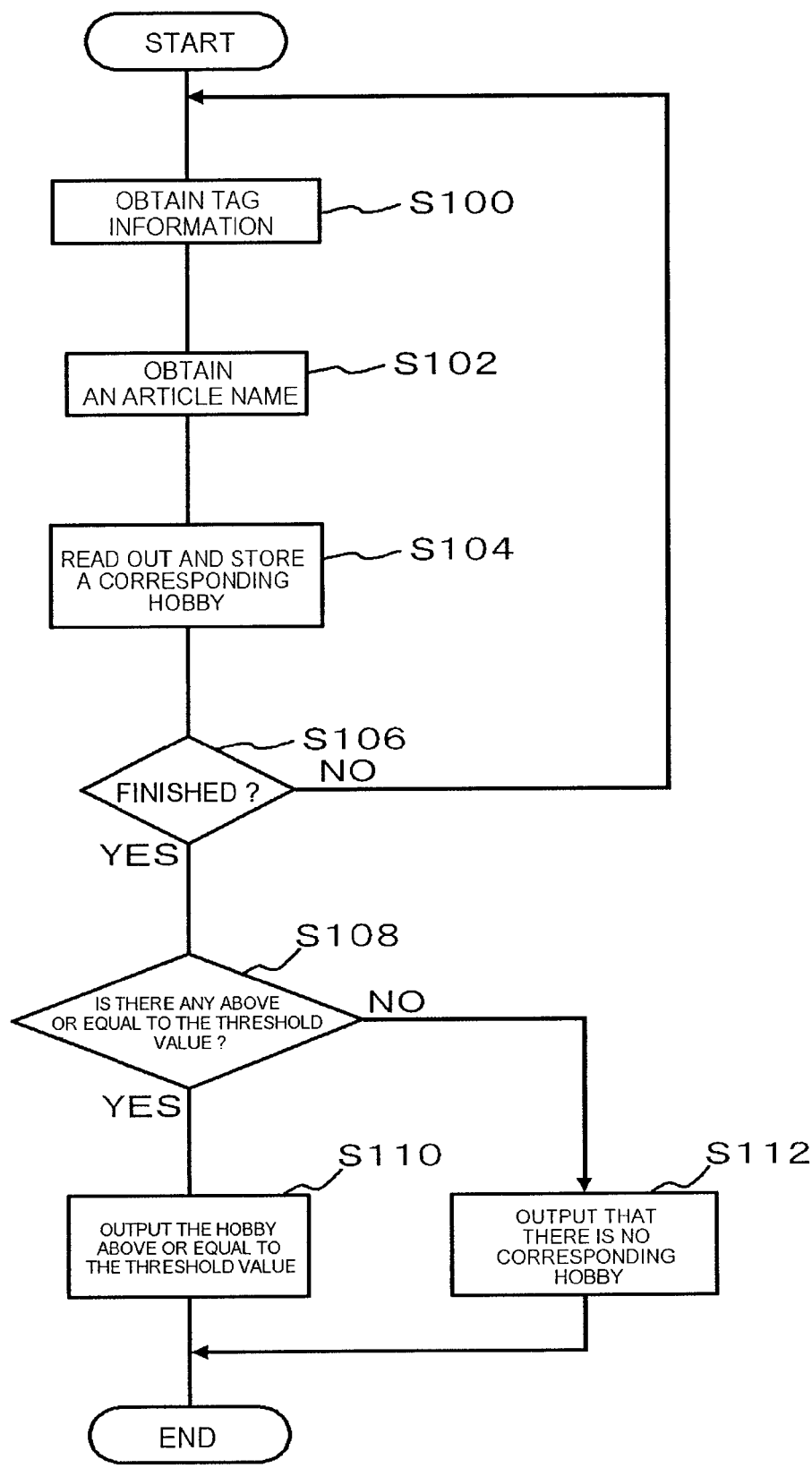
FIG. 5 is a flowchart showing the processing procedure of the user preference inferring apparatus in more detail.

FIG. 5 is a flowchart showing in more detail the processing procedure of the user preference inferring apparatus 100. Hereafter, description will be given by making reference also to FIGS. 1 to 3.

First, the receiving means 2 obtains tag information from an IC tag 1 (step S100). Subsequently, on the basis of the tag information that the receiving means 2 has obtained, the article name determining means 3 obtains a corresponding article name from the article name database 6 (step S102). Subsequently, on the basis of the article name that the article name determining means 3 has obtained, the preference determining means 4 reads out a corresponding hobby from the preference information database 5, and stores the hobby in the read-out result storing unit 19 in correspondence with the number of read-out times thereof (step S104).

Subsequently, the controlling unit (not illustrated) of the operating means 10 determines whether the process for all the articles has been finished or not (step S106). The determination on whether the process for all the articles has been finished or not can be made, for example, by determining whether the tag information of all the articles within a predetermined range on which the receiving means 2 can obtain tag information has been obtained or not. When the process is not finished yet (NO in the step S106), the flow returns to the step S100, where a similar process is repeated for the next article.

On the other hand, when the process is finished in the step S106 (YES in the step S106), the preference determining means 4 makes reference to the read-out result storing unit 19 and the threshold value storing unit 15, and determines whether or not the number of read-out times for each of the hobbies stored in the read-out result storing unit 19 is above or equal to the threshold value stored in the threshold value storing unit 15 (step S108). When there is a hobby above or equal to the threshold value (YES in the step S108), the hobby above or equal to the threshold value is determined as a hobby of the user, and the determination result is output (step S110). At this time, when there are a plurality of hobbies above or equal to the threshold value, the preference determining means 4 may output all of them, or may output preferentially from the hobby having a larger number of read-out times.

On the other hand, when there is no hobby above or equal to the threshold value in the step S108 (NO in the step S108), the preference determining means 4 determines that the reliability of determination is low, and outputs that there is no corresponding hobby (S112).

Hereafter, concrete examples will be described. For example, suppose that threshold value=2 is stored in the threshold value storing unit 15. Also, suppose that the article name determining means 3 obtains "fishing rod a of A company" and "fishing rod b of A company" as article names. In this case, when the preference determining means 4 searches into the preference information database 5 using the article names as a search key, the number of read-out times for "hobby"="fishing" will be two. Every time the preference determining means 4 reads out "hobby"="fishing" from the preference information database 5, the preference determining means 4 stores that fact into the read-out result storing unit 19. After the reading-out process is finished, the preference determining means 4 makes reference to the threshold value storing unit 15 and the read-out result storing unit 19. Here, since the number of read-out times for "hobby"="fishing" is above or equal to the threshold value, the preference determining means 4 determines that the hobby of this user is "fishing". The preference determining means 4 determines that the hobby of the user is "fishing", and outputs that fact.

FIG. 6 is a view showing another example of an internal structure of a preference information database 5.

Here, the preference information database 5 includes a hobby column and an article data column. The article data column includes an article name column and a weight column. Here, a weight is defined in advance for each of the articles. For example, in the article name column corresponding to "fishing" in the hobby column, "fishing rod a of A company", "fishing rod b of A company", and "book of B company, "Introduction to fishing"" are stored, and the weights thereof are set as "15", "15", and "10", respectively.

Figure 7:
FIG. 7 is a view showing one example of an internal structure of the read-out result storing unit in the case where the preference information database has a structure shown in FIG. 6.

FIG. 7 is a view showing one example of an internal structure of the read-out result storing unit 19 in the case where the preference information database 5 has a structure shown in FIG. 6.

Here, the read-out result storing unit 19 includes a hobby column and a weight sum column. The preference determining means 4 reads out the weight together with the hobby from the preference information database 5 and, each time they are read out, the preference determining means 4 adds the read-out weight to the weight sum column corresponding to the hobby in the read-out result storing unit 19.

Returning to FIG. 1, in this case, the threshold value considering the weight is stored in the threshold value storing unit 15 as well. After the reading-out process is finished, the preference determining means 4 makes reference to the read-out result storing unit 19 and the threshold value storing unit 15 and, when the weight sum for any of the hobbies is above or equal to the threshold value stored in the threshold value storing unit 15, the preference determining means 4 determines that the hobby is a hobby of the user. In this case as well, when the weight sum for all of the hobbies is lower than the threshold value, the preference determining means 4 may determine that the reliability of determination is low and stop outputting the determination result.

In the threshold value storing unit 15, the weight can be set to be low for an article having a high possibility of being owned by a lot of people irrespective of the hobbies. For example, when the article is a "book", if the book is a best seller, there is a possibility that the book is owned by a person whose interest in the field related to the book is not so high. For this reason, the weight in the threshold value storing unit 15 can be suitably set also in accordance with how well each of the articles is sold or the like. Also, the weight of the threshold value storing unit 15 can be suitably renewed. In this manner, by allowing the preference information database 5 to store the weight in correspondence with the article name and by considering also the weight in determining the hobby of the user, the hobby of the user can be determined with a better precision.

Figure 8:
FIG. 8 is a view showing one example of an internal structure of a threshold value storing unit.

FIG. 8 is a view showing one example of an internal structure of a threshold value storing unit 15.

The threshold value storing unit 15 can be set to store one threshold value for all of the hobbies; however, the threshold value storing unit 15 can be made to store a different threshold value for each of the hobbies, as illustrated in FIG. 8. Here, the threshold value for the hobby "fishing" is "2"; the threshold value for the hobby "listening to classic music" is "10"; the threshold value for the hobby "skiing" is "2"; and the threshold value for the hobby "overseas traveling" is "10". For example, when there is a high possibility that a lot of people own an article related to a hobby irrespective of the hobby of the user, the threshold value for the hobby can be set to be high. This also makes it possible to determine the hobby of the user with a better precision.

Here, in the present embodiment, in order to prevent observation of the same article for plural times in adding, an ID specific to the article may be buried in the IC tag 1, and to allow the ID to be added only once even if the ID is observed for plural times. For example, the user preference inferring apparatus 100 may include a storing unit (not illustrated) storing the tag information of the IC tag 1 that the receiving means 2 has read in. In reading tag information from a certain IC tag 1, the receiving means 2 may make reference to the storing unit so as to determine whether the tag information of the IC tag 1 has been already read in and processed and, when the tag information has not been read in yet, the subsequent processes may be carried out. This can prevent duplicated processing of the observation result of the same article.

Also, in other examples, the user preference inferring apparatus 100 may have a structure including an article name database 6 within its own apparatus. In this case, the article name database 6 may hold information in which the tag information and the article name (product name) are arranged in correspondence. The article name determining means 3 can obtain a product name from the article name database 6 using the tag information as a key.

According to the user preference inferring apparatus 100 in the present embodiment, the preference information of the user can be captured without an explicit input of the user. Also, in recent years, at the time of production of articles or at the stage of product distribution such as at the time of selling, a process of attaching a tag to an article and controlling the article with use of the tag is carried out. According to the present invention, the tag information used at the product distribution stage can be utilized, on the side of a user after selling, for inferring the preference of the user.

Also, in the present embodiments the user preference inferring apparatus 100 reads tag information from articles located within a predetermined range in which the user preference inferring apparatus 100 reads tag information, and infers the user's preference on the basis of the information. For this reason, the user's preference can be inferred on the basis of the articles that the user actually owns at the time of inferring, so that the preference can be inferred correctly even if the user's preference undergoes change or the like.

Second Embodiment

Figure 9:
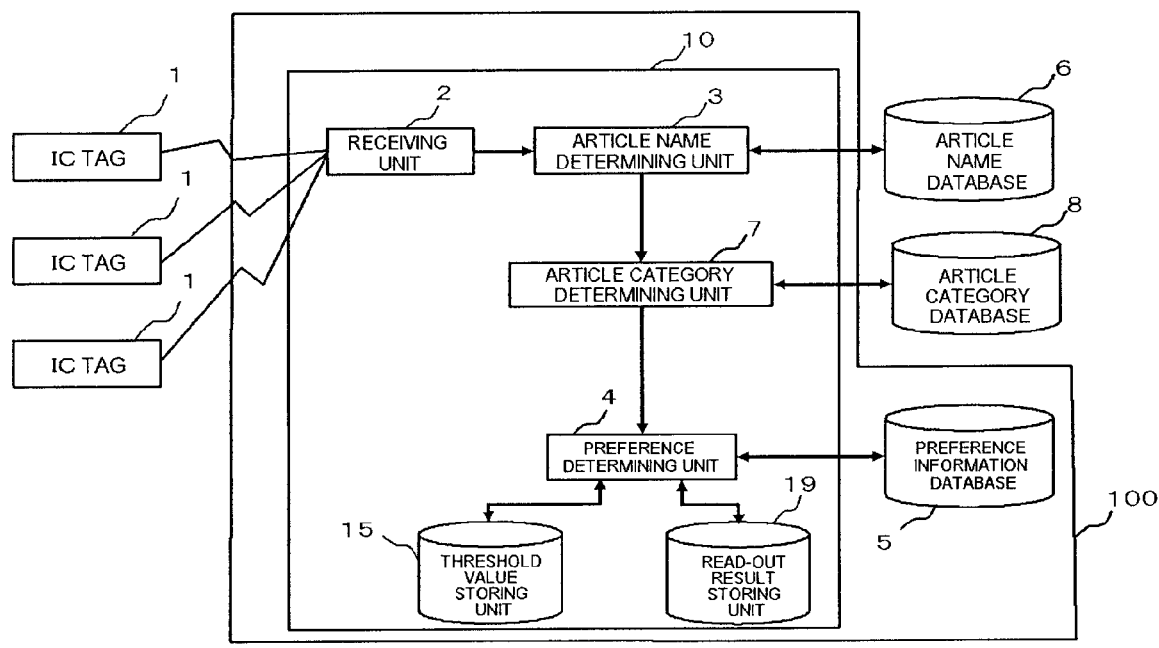
FIG. 9 is a view showing a structure of a user preference inferring apparatus according to an embodiment of the present invention.

FIG. 9 is a view showing a structure of a user preference inferring apparatus 100 according to the present embodiment.

In the present embodiment, the operating means 10 further includes an article category determining means 7 (article category obtaining unit) in addition to the constituent elements described with reference to FIG. 1 in the first embodiment. Also, the internal structure of the preference information database 5 is different from that of the preference information database 5 in the first embodiment.

The article category database 8 has a database structure that stores an article name and a category corresponding to the article name in correspondence. The article category database 8 is stored, for example, in a Web server connected to the Internet. The article category determining means 7 obtains a corresponding category from the article category database 8 via a network.

In the present embodiment, the article name determining means 3 notifies the article category determining means 7 of the article name that has been obtained by searching into the article name database 6. The article category determining means 7 obtains a category corresponding to the article name as a search result by searching into the article category database 8 using, as a search key, the article name that has been notified by the article name determining means 3.

The preference determining means 4 receives the category from the article category determining means 7, and searches into the preference information database 5 using this category, so as to determine the user's preference.

FIG. 10 is a view showing one example of an internal structure of the preference information database 5 in the present embodiment.

The preference information database 5 includes a hobby column and an article category name column of an article serving as a standard for determining that the user has the hobby. Here, the hobby column stores, for example, "fishing", "listening to classic music", "skiing", and "overseas traveling". For example, the article category name column corresponding to "fishing" in the hobby column stores "fishing rod", "book of fishing", and "reel".

Figure 11:
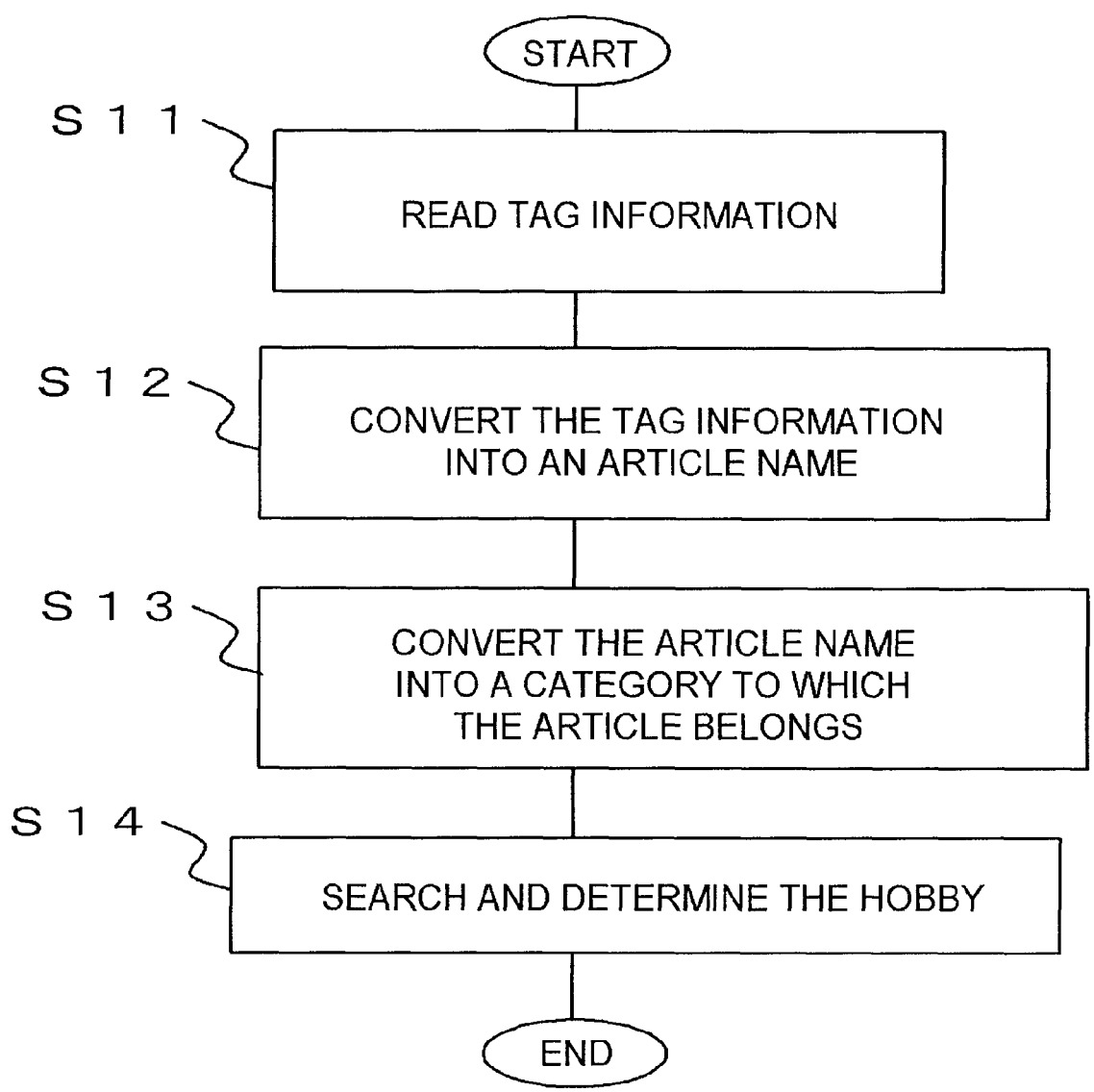
FIG. 11 is a flowchart showing a processing procedure of the user preference inferring apparatus shown in FIG. 9.

FIG. 11 is a flowchart showing a processing procedure of the user preference inferring apparatus 100 shown in FIG. 9.

First, the receiving means 2 reads tag information from an IC tag 1 located in the surroundings (step S11). At this time, the receiving means 2 can read tag information of one IC tag 1, or can read tag information of a plurality of IC tags 1. Subsequently, on the basis of the tag information that the receiving means 2 has read, the article name determining means 3 searches into the article name database 6, and obtains a corresponding article name (step S12). Thereafter, the article name determining means 3 notifies the article category determining means 7 of the obtained article name.

Subsequently, on the basis of the article name obtained from the article name determining means 3, the article category determining means 7 searches into the article category database 8, and specifies the category to which the article belongs (step S13). The article category determining means 7 can obtain a category name corresponding to the article name by making access to the article category database 8 via a network. For example, the article category database 8 can store the article name "personal computer of type number XXXX of A company" in correspondence with the category name "personal computer". In this case, for example, when the article name obtained by the article name determining means 3 is "personal computer of type number XXXX of A company", the article category that the article category determining means 7 obtains by searching into the article category database 8 will be "personal computer".

Subsequently, the preference determining means 4 searches into the preference information database 5, and determines the user's preference (step S14). The process of determining the user's preference can be carried out in the same manner as in the steps S104 to S112 described with reference to FIG. 5 in the first embodiment.

Namely, on the basis of the article category that the article category determining means 7 has obtained, the preference determining means 4 reads out a corresponding hobby from the preference information database 5, and stores the number of read-out times in the read-out result storing unit 19 in correspondence with the hobby. Subsequently, the controlling unit (not illustrated) of the operating means 10 determines whether the reading-out process for all the articles has been finished or not. When the process is not finished yet, the flow returns to the step S11, where a similar process is repeated for the next article. On the other hand, when the process is finished, the preference determining means 4 makes reference to the read-out result storing unit 19 and the threshold value storing unit 15, and determines whether or not the number of read-out times for each of the hobbies stored in the read-out result storing unit 19 is above or equal to the threshold value stored in the threshold value storing unit 15. When there is a hobby above or equal to the threshold value, the hobby above or equal to the threshold value is determined as a hobby of the user, and the determination result is output. At this time, when there are a plurality of hobbies above or equal to the threshold value, the preference determining means 4 may output all of them, or may output preferentially from the hobby having a larger number of read-out times.

Hereafter, concrete examples will be described. For example, suppose that threshold value=2 is stored in the threshold value storing unit 15. Also, suppose that the article category determining means 7 obtains "fishing rod" two times as a category name. In this case, when the preference determining means 4 searches into the preference information database 5 using the category name as a search key, the number of read-out times for "hobby"="fishing" will be two. Every time the preference determining means 4 reads out "hobby"="fishing" from the preference information database 5, the preference determining means 4 stores that fact into the read-out result storing unit 19. After the reading-out process is finished, the preference determining means 4 makes reference to the threshold value storing unit 15 and the read-out result storing unit 19. Here, since the number of read-out times for "hobby"="fishing" is above or equal to the threshold value, the preference determining means 4 determines that the hobby of the user is "fishing", and outputs that fact.

FIG. 12 is a view showing another example of an internal structure of a preference information database 5.

Here, the preference information database 5 includes a hobby column and an article data column. The article data column includes an article category name column and a weight column. Here, a weight is defined in advance for each of the article category names. At this time, the read-out result storing unit 19 has a structure similar to the one described with reference to FIG. 7 in the first embodiment.

Every time the article category determining means 7 obtains an article category name, the preference determining means 4 reads out the weight together with the hobby from the preference information database 5 and adds the read-out weight to the weight sum column corresponding to the hobby in the read-out result storing unit 19. After the reading-out process is finished, the preference determining means 4 makes reference to the read-out result storing unit 19 and the threshold value storing unit 15 and, when the weight sum for any of the hobbies is above or equal to the threshold value stored in the threshold value storing unit 15, the preference determining means 4 determines that the hobby is a hobby of the user, and outputs to that fact. In this case as well, when the weight sum for all of the hobbies is lower than the threshold value, the preference determining means 4 may determine that the reliability of determination is low and stop outputting the determination result.

Here, in the present embodiment, in order to prevent observation of the same article for plural times in adding, an ID specific to the article may be buried in the IC tag 1, and to allow the ID to be added only once even if the ID is observed for plural times.

Also, in other examples, the user preference inferring apparatus 100 may have a structure including an article name database 6 and an article category database 8 within its own apparatus. In this case, the article name database 6 may hold information in which the tag information and the article name (product name) are arranged in correspondence. Also, the article category database 8 may hold information in which the article name and the category name are arranged in correspondence.

Further, the article named at a base 6 and the article category database 8 may be integrally formed. Namely, it is possible to adopt a structure such that one database holds information in which tag information, an article name, and a category name are arranged in correspondence.

In the present embodiment as well, an effect similar to that of the user preference inferring apparatus 100 in the first embodiment can be obtained. Also, the preference information database 5 of the present embodiment may have a structure in which a plurality of article names are grouped under one category name, and a hobby is stored in correspondence therewith. Therefore, the preference information database 5 can be prepared in a simple manner. Also, renewal or the like of the preference information database 5 can be carried out easily.

Third Embodiment

Figure 13:
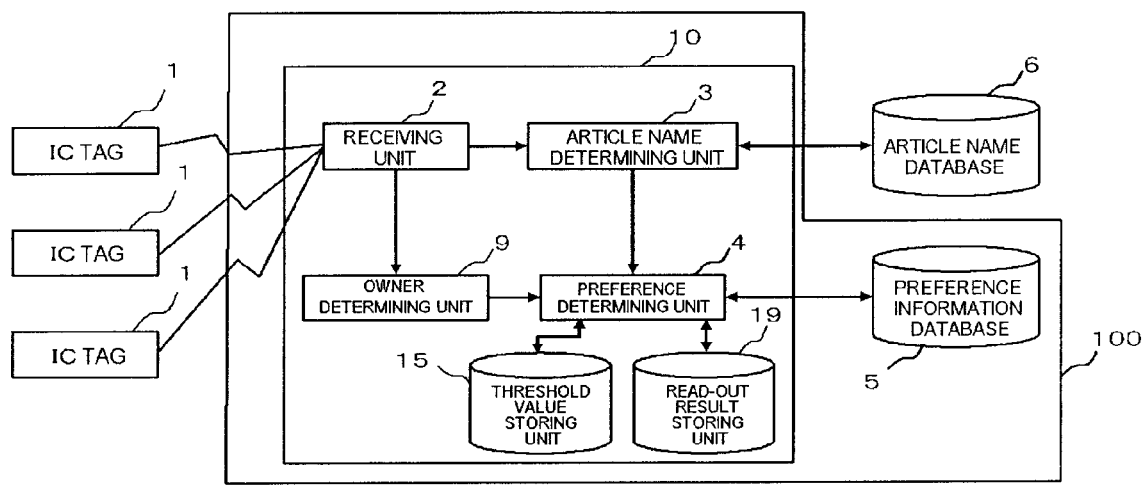
FIG. 13 is a block diagram showing a structure of a user preference inferring apparatus according to an embodiment of the present invention.

FIG. 13 is a block diagram showing a structure of a user preference inferring apparatus 100 in the present embodiment.

In the present embodiment, for each article, the user preference inferring apparatus 100 infers the owner of the article and, for each owner, the user preference inferring apparatus 100 determines the preference of the owner. This allows that, even if a plurality of articles that a plurality of persons respectively own are arranged in a room, the preference can be inferred for each owner.

The operating means 10 further includes an owner determining means 9 (owner inferring unit) in addition to the constituent elements described with reference to FIG. 1 in the first embodiment. The owner determining means 9 infers the owner for each article. The owner determining means 9 can infer the owner of each article, for example, in the following manner.

For example, the owner determining means 9 may include a storing unit (not illustrated) that the user stores in advance the owner related to individual articles. Specifically, for example, the storing unit may store information (tag information) identifying the article stored in the IC tag 1 attached to an article and information identifying the user in correspondence. On the basis of the tag information that the receiving means 2 has read out from the IC tag 1, the owner determining means 9 may read out the information identifying the user from the storing unit and infer the owner of the article on the basis thereof.

Also, in other examples, the owner determining means 9 may obtain a purchase record of individual articles from information such as a credit card or electronic payment, and may determine the owner by specifying the purchaser. Specifically, for example, the owner determining means 9 may make access to a database that stores purchase records, so as to infer the owner. The database that stores the purchase records may have a structure in which access verification is carried out, and the owner determining means 9 may retain a password, an ID, and the like for carrying out the access verification. The owner determining means 9 may make access to the database that stores purchase records, carry out access verification, and obtain needed information from the database.

Also, in other examples, the user preference inferring apparatus 100 may detect a person and an article by processing information of a sensor such as a camera, and specifying a frequent user to determine as an owner. Namely, the user preference inferring apparatus 100 may record a history of use of articles by persons, and infer the owner on the basis of the record. The history of use of articles may be obtained, for example, by detecting the presence of a person by image recognition with a camera or the like and, when the IC tag 1 attached to an article has moved at that time, determining that the person uses the article and storing the person and the article in correspondence.

Figure 14:
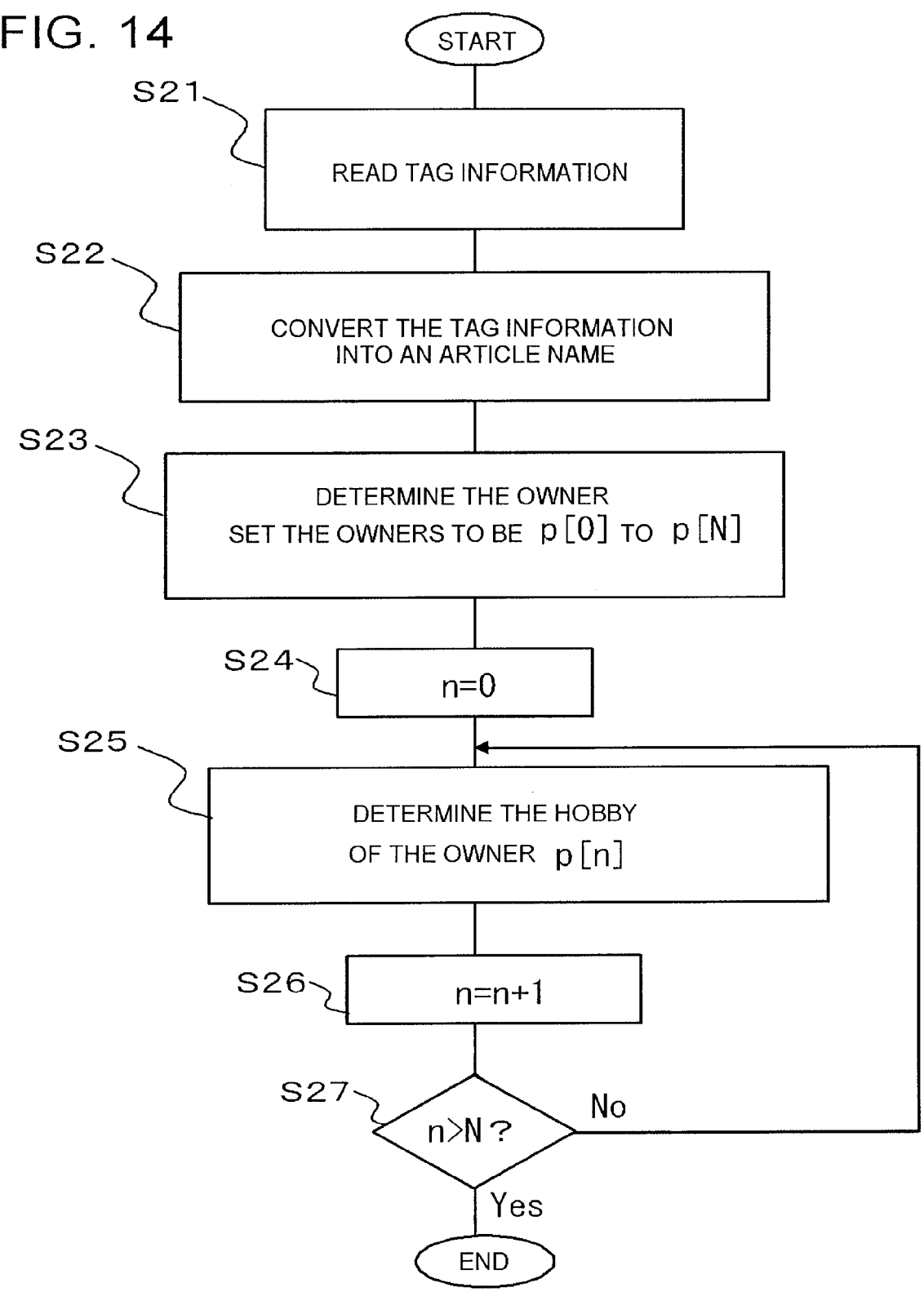
FIG. 14 is a flowchart showing a processing procedure of the user preference inferring apparatus shown in FIG. 13.

FIG. 14 is a flowchart showing a processing procedure of the user preference inferring apparatus 100 shown in FIG. 13. Hereafter, description will be given by making reference also to FIG. 13.

The step S21 and the step S22 are respectively similar to the step S1 and the step S2 described with reference to FIG. 4 in the first embodiment, so that the description thereof will not be repeated.

In the present embodiment, the owner determining means 9 determines the owner of each article. Here, the owners are set to be p[n] (p[0] to p[N]) (step S23).

Here, the owner determining means 9 may store the result of determining the owner in correspondence with the article name of the article in a database (not illustrated). When the determination of the owners of the observed articles is finished, the preference determining means 4 first sets n=0 (step S24). Subsequently, the preference determining means 4 searches the article name of the article whose owner is p[n] from the database by making reference to the database of the owner determining means 9, and determines the hobby of the owner p[n] (step S25). The determination of the hobby for each owner can be carried out, for example, in the same manner as in the step S3 of FIG. 4 described in the first embodiment.

Next, it is set that n=n+1 (step S26). Thereafter, whether n is larger than N or not is determined (step S27) and, when n>N does not hold (NO in the step S27), the flow returns to the step S25, and a similar process is repeated. On the other hand, when n>N holds in the step S27 (YES in the step S27), the process is finished. Through the above process, the hobbies of the owners p[0] to p[N] can be determined.

Figure 15:
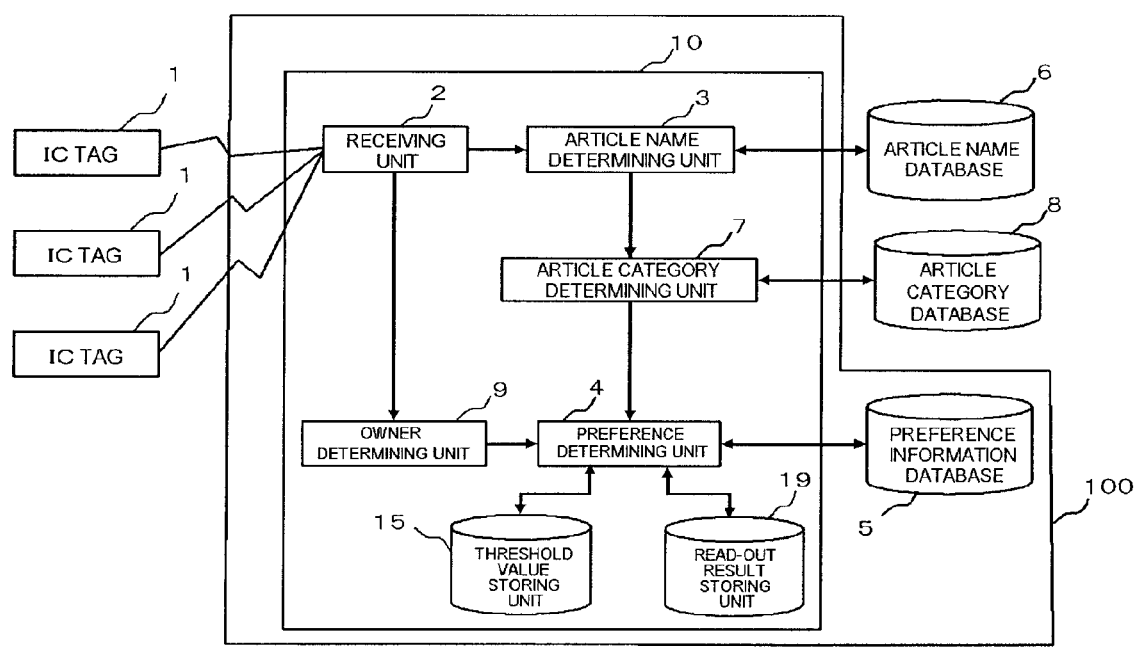
FIG. 15 is a block diagram showing another example of a structure of a user preference inferring apparatus according to an embodiment of the present invention.

FIG. 15 is a block diagram showing another example of a structure of a user preference inferring apparatus 100 in the present embodiment.

Here, the user preference inferring apparatus 100 further includes an article category determining means 7 in the same manner as described with reference to FIG. 9 in the second embodiment. The other constituent elements are similar to those of the structure shown in FIG. 13.

Figure 16:
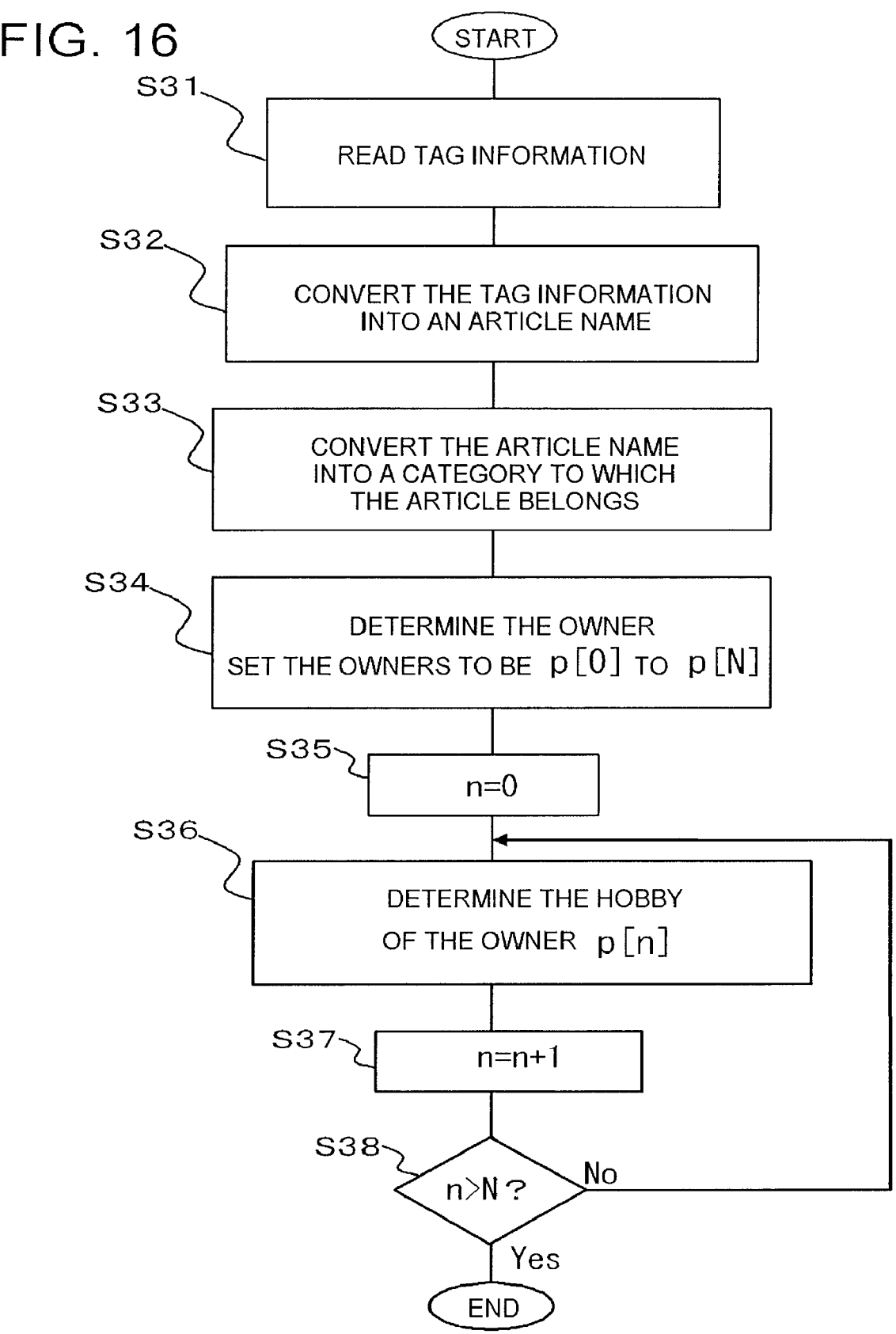
FIG. 16 is a flowchart showing a processing procedure of the user preference inferring apparatus shown in FIG. 15.

FIG. 16 is a flowchart showing a processing procedure of the user preference inferring apparatus 100 shown in FIG. 15.

The step S31 to the step S33 are respectively similar to the step S11 to the step S13 described with reference to FIG. 11 in the second embodiment, so that the description thereof will not be repeated. Also, the step S34 to the step S38 are respectively similar to the step S23 to the step S27 described with reference to FIG. 14 in the present embodiment, so that the description thereof will not be repeated. The owner determining means 9 may store, in a database (not illustrated), the result of determining the owner of each article in the step S34 in correspondence with the category to which the article belongs. In the step S36, the preference determining means 4 searches the category to which the article whose owner is p[n] belongs from the database by making reference to the database of the owner determining means 9, and determines the hobby of the owner p[n].

In the present embodiment as well, an effect similar to those of the first embodiment and the second embodiment will be obtained. Also, according to the user preference inferring apparatus 100 in the present embodiment, even if articles of plural owners are arranged within a predetermined range where the user preference inferring apparatus 100 reads tag information, the preference of each owner can be inferred by considering the owner.

Fourth Embodiment

Figure 17:
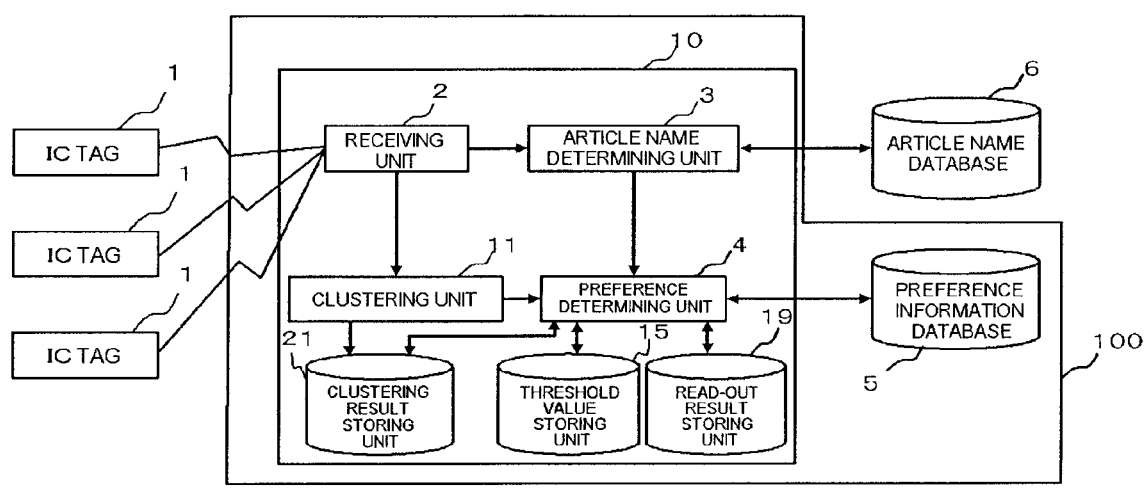
FIG. 17 is a view showing a structure of a user preference inferring apparatus according to an embodiment of the present invention.

FIG. 17 is a block diagram showing a structure of a user preference inferring apparatus 100 in the present embodiment.

In the present embodiment, the operating means 10 clusters, according to a predetermined standard, a plurality of articles on which the receiving means 2 has read tag information, and determines the preference for each cluster. By this, the user's preference can be inferred with a better precision.

In addition to the constituent elements described with reference to FIG. 1 in the first embodiment, the operating means 10 further includes a clustering means 11 (clustering processing unit) and a clustering result storing unit 21. The clustering means 11 clusters, according to a predetermined standard, a plurality of articles on which the receiving means 2 has read tag information. The clustering result storing unit 21 stores the result of clustering by the clustering means 11.

In the present embodiment, the clustering means 11 may obtain position information of articles on which the receiving means 2 has read tag information. On the basis of the position information of the articles, the clustering means 11 may cluster in the same cluster the articles whose position where they are located or whose relative positional relationship among the articles is near to each other.

The clustering means 11 can obtain position information of each article by various methods, and is not particularly limited; however, the clustering means 11 can obtain position information of each article in the following manner.

For example, the clustering means 11 may have a structure of obtaining the self-position of the user preference inferring apparatus 100. If the range of reading the tag information from the IC tag 1 by the receiving unit is not so wide, the user preference inferring apparatus 100 obtains tag information from the IC tag 1 attached to an article located within a predetermined range by being moved by the user or by spontaneous movement. In this case, the position information of the article can be obtained by obtaining the self-position of the user preference inferring apparatus 100 when the receiving means 2 has obtained the tag information.

Also, in other examples, the clustering means 11 may obtain the position information of the article on the basis of electromagnetic wave intensity or the like of the IC tag 1 and the receiving means 2 when the receiving means 2 obtains the tag information from the IC tag 1.

Figure 18:
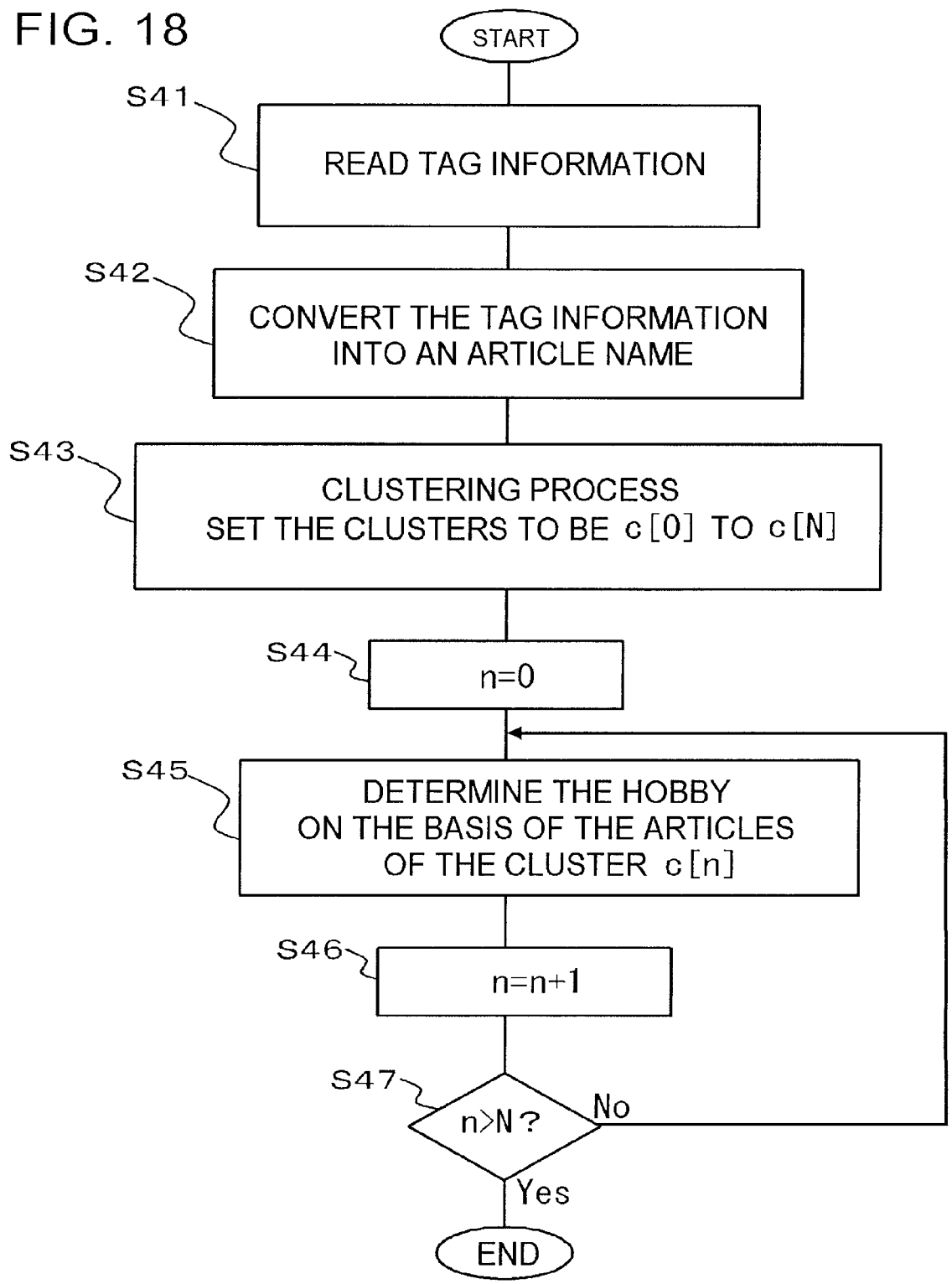
FIG. 18 is a flowchart showing a processing procedure of the user preference inferring apparatus shown in FIG. 17.

FIG. 18 is a flowchart showing a processing procedure of the user preference inferring apparatus 100 shown in FIG. 17. Hereafter, description will be given with reference to FIG. 17 also.

The step S41 and the step S42 are respectively similar to the step S1 and the step S2 described with reference to FIG. 4 in the first embodiment, so that the description thereof will not be repeated.

The clustering means 11 clusters a plurality of articles observed in the step S41 and the step S42. Here, the name of each cluster will be set to be c[n] (c[0] to c[N]) (step S43). The clustering means 11 stores the result of clustering into a clustering result storing unit 21 in correspondence with the article name of the article.

When the clustering of the observed articles is finished, the preference determining means 4 first sets n=0 (step S44). Subsequently, with reference to the clustering result storing unit 21, the preference determining means 4 reads the article name of the article having a cluster name of c[n] out from the clustering result storing unit 21. Next, the preference determining means 4 reads a hobby corresponding to the article name out from the preference information database 5, and stores the article name into the read-out result storing unit 19 in correspondence with the number of read-out times. When the process is finished for all the articles having a cluster name of c[n], the hobby is determined on the basis of the articles that belong to the cluster having a cluster name of c[n] by comparing the number of read-out times stored in the read-out result storing unit 19 and the threshold value stored in the threshold value storing unit 15 (step S45).

Next, it is set that n=n+1 (step S46). Thereafter, whether n is larger than N or not is determined (step S47) and, when n>N does not hold (NO in the step S47), the flow returns to the step S45, and a similar process is repeated. On the other hand, when n>N holds in the step S47 (YES in the step S47), the process is finished. Through the above process, the hobbies of the clusters having cluster names c[0] to c[N] can be determined.

Figure 19:
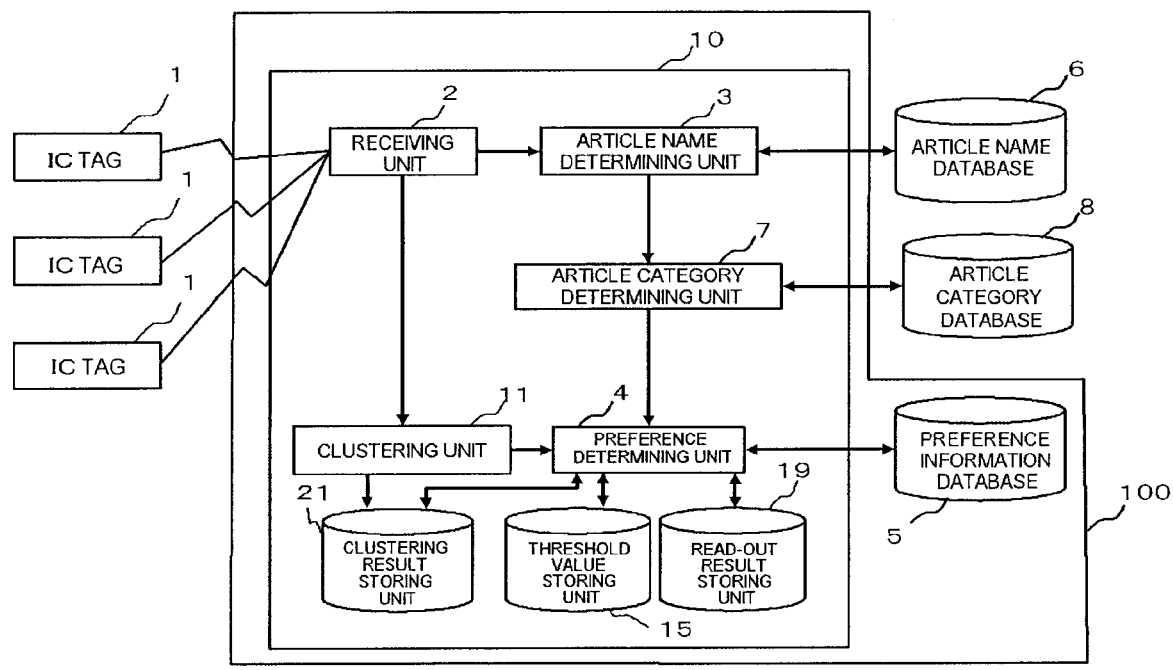
FIG. 19 is a block diagram showing another example of a structure of a user preference inferring apparatus according to an embodiment of the present invention.

FIG. 19 is a block diagram showing another example of a structure of a user preference inferring apparatus 100 in the present embodiment.

Here, the user preference inferring apparatus 100 further includes an article category determining means 7 in the same manner as described with reference to FIG. 9 in the second embodiment. The other constituent elements are similar to those of the structure shown in FIG. 17.

Figure 20:
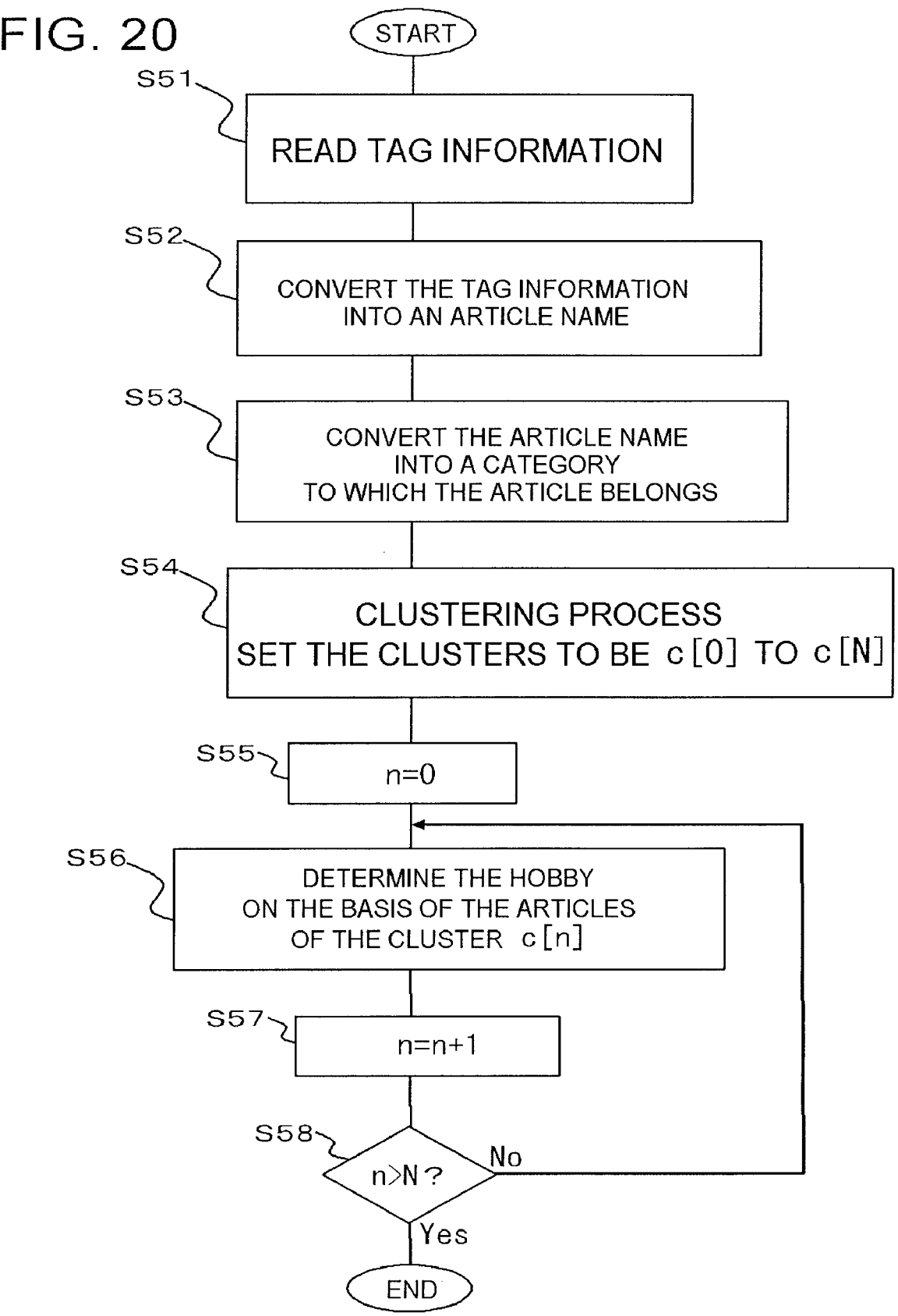
FIG. 20 is a flowchart showing a processing procedure of the user preference inferring apparatus shown in FIG. 19.

FIG. 20 is a flowchart showing a processing procedure of the user preference inferring apparatus 100 shown in FIG. 19.

The step S51 to the step S53 are respectively similar to the step S11 to the step S13 described with reference to FIG. 11 in the second embodiment, so that the description thereof will not be repeated. Also, the step S54 to the step S58 are respectively similar to the step S43 to the step S47 described with reference to FIG. 18 in the present embodiment, so that the description thereof will not be repeated. The clustering means 11 stores the result of clustering a plurality of articles in the step S54 into the clustering result storing unit 21 in correspondence with the category to which the articles belong. In the step S56, with reference to the clustering result storing unit 21, the preference determining means 4 reads the category of the articles having a cluster name of c[n] out from the read-out result storing unit 19. Subsequently, the preference determining means 4 reads out the hobby corresponding to the category from the preference information database 5, and stores the category into the read-out result storing unit 19 in correspondence with the number of read-out times. When the process is finished for all the articles having a cluster name of c[n], the hobby is determined on the basis of the articles that belong to the cluster having a cluster name of c[n] by comparing the number of read-out times stored in the read-out result storing unit 19 and the threshold value stored in the threshold value storing unit 15.

In the present embodiment as well, an effect similar to those of the first embodiment and the second embodiment will be obtained. Also, according to the user preference inferring apparatus 100 in the present embodiment, the preference can be inferred for each cluster, whereby errors are less likely to be generated, and the preference can be inferred with a better precision.

Fifth Embodiment

Figure 21:
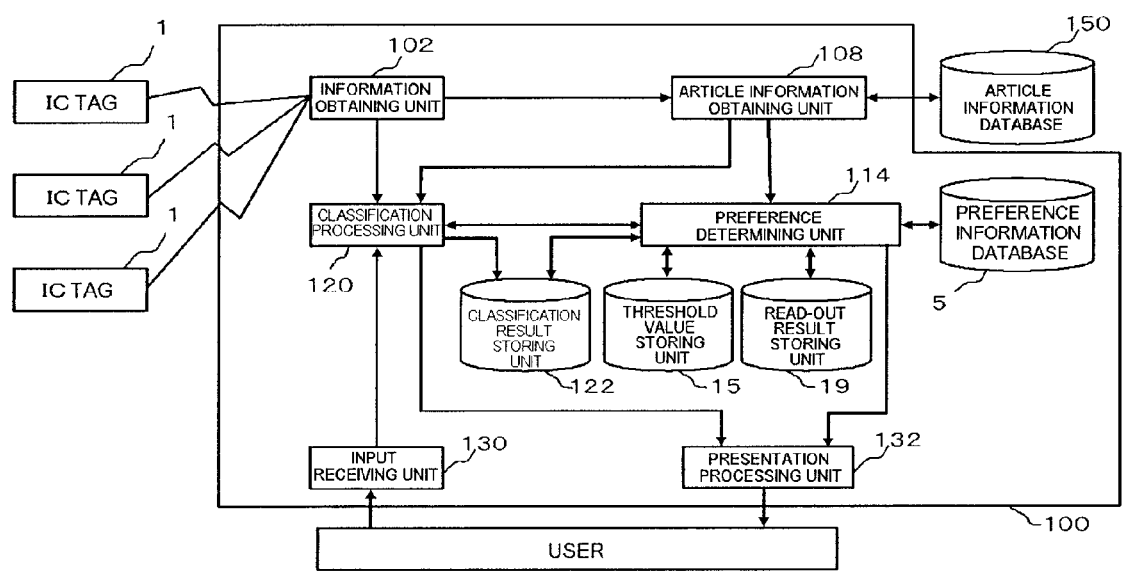
FIG. 21 is a view showing a structure of a user preference inferring apparatus according to an embodiment of the present invention.

FIG. 21 is a view showing a structure of a user preference inferring apparatus 100 in the present embodiment.

In the present embodiment, for each article, the user preference inferring apparatus 100 infers the owner of the article and, for each owner, the user preference inferring apparatus 100 determines the preference of the owner in the same manner as described in the third embodiment. This allows that, even if a plurality of articles that a plurality of persons respectively own are arranged in a room, the preference can be inferred for each owner.

The user preference inferring apparatus 100 includes an information obtaining unit 102, an article information obtaining unit 108, a preference determining unit 114, a classification processing unit 120, an input receiving unit 130, a presentation processing unit 132, a preference information database 5, a threshold value storing unit 15, a read-out result storing unit 19, and a classification result storing unit 122. In the present embodiment, the information obtaining unit 102, the article information obtaining unit 108, the preference determining unit 114, the classification processing unit 120, the input receiving unit 130, and the presentation processing unit 132 can be realized by the operating unit described in the first to fourth embodiments. Here, each constituent element of the user preference inferring apparatus 100 is controlled by a controlling unit which is not illustrated in the drawings.

Hereafter, the relationship between each constituent element in the present embodiment and each constituent element in the first to third embodiments will be described. The information obtaining unit 102 has a function similar to that of the receiving means 2. The article information obtaining unit 108 has one or both of the functions of the article name determining means 3 and the article category determining means 7. The article information database 150 has a structure including one or both of the article name database 6 and the article category database 8. The preference determining unit 114 has a function similar to that of the preference determining means 4.

In the present embodiment, the input receiving unit 130 receives instructions and the like from a user. The input receiving unit 130 can be realized, for example, by a combination of a voice inputting unit and a voice recognition unit, a GUI (Graphical User Interface), or a button. The presentation processing unit 132 performs a process of presenting information to the user. The presentation processing unit 132 performs a displaying process or a voice outputting process to a display, a speaker, or the like.

The classification processing unit 120 classifies, according to a predetermined standard, the articles on which the information obtaining unit 102 has read tag information. In the present embodiment, the classification processing unit 120 has a function similar to that of the owner determining means 9 in the third embodiment. The classification result storing unit 122 stores the result of classification by the classification processing unit 120.

Each time the classification processing unit 120 reads tag information, for example, the classification processing unit 120 may infer the owner of the article and may store the tag information of the article into the classification result storing unit 122 in correspondence with the owner of the article. Also, each time the article information obtaining unit 108 obtains article information from the article information database 150, the classification processing unit 120 may infer the owner of the article and may store the tag information of the article into the classification processing unit 120 in correspondence with the owner of the article.

In the present embodiment, the classification processing unit 120 infers the owner for each article by a method similar to the one described with respect to the owner determining means 9 in the third embodiment or various other methods.

For example, the classification processing unit 120 can infer the owner of an article on the basis of the position information of the article. In this case, for example, the following may be carried out. In the case where the user preference inferring apparatus 100 is to obtain information of a plurality of articles located in a certain house, the user preference inferring apparatus 100 may include a storing unit that stores map information in which the position information of each room and the owner of each room are arranged in correspondence. When the information obtaining unit 102 reads tag information from an IC tag 1 attached to an article, for example, the classification processing unit 120 may obtain the position information of the article, and may infer the owner of each article on the basis of the map information.

Also, in the user preference inferring apparatus 100, in inferring the owner of an article, the classification processing unit 120 may make an inquiry to the user on the owner via the presentation processing unit 132, and may allow a reply from the user to be input via the input receiving unit 130. This allows that the classification processing unit 120 can infer the owner of the article. In this case, the classification processing unit 120 can make an inquiry to the user for each article; however, if a reply from the user is obtained for a certain article, the articles in the surroundings thereof may be inferred to be owned by the same user. This reduces the burden imposed upon the user.

Also, as another example, a tag different from the IC tag 1 for holding the information identifying the owner may be attached to the article. In this case, every time the information obtaining unit 102 reads out the tag information from the IC tag 1, the information obtaining unit 102 reads out tag information from the different tag as well. On the basis of the information identifying the owner that the information obtaining unit 102 has read out, the classification processing unit 120 can infer the owner of each article. In this case as well, a tag may be attached to all the articles; however, one may adopt a structure in which the tag is attached to only a limited number of articles, and the classification processing unit 120 may infer that the articles located in the surroundings thereof are owned by the same owner. For example, to a bookshelf located in a certain room, a tag that holds information identifying the owner thereof may be attached, and the books arranged on that bookshelf may be inferred to be owned by the same owner as the owner of the bookshelf.

Figure 22:
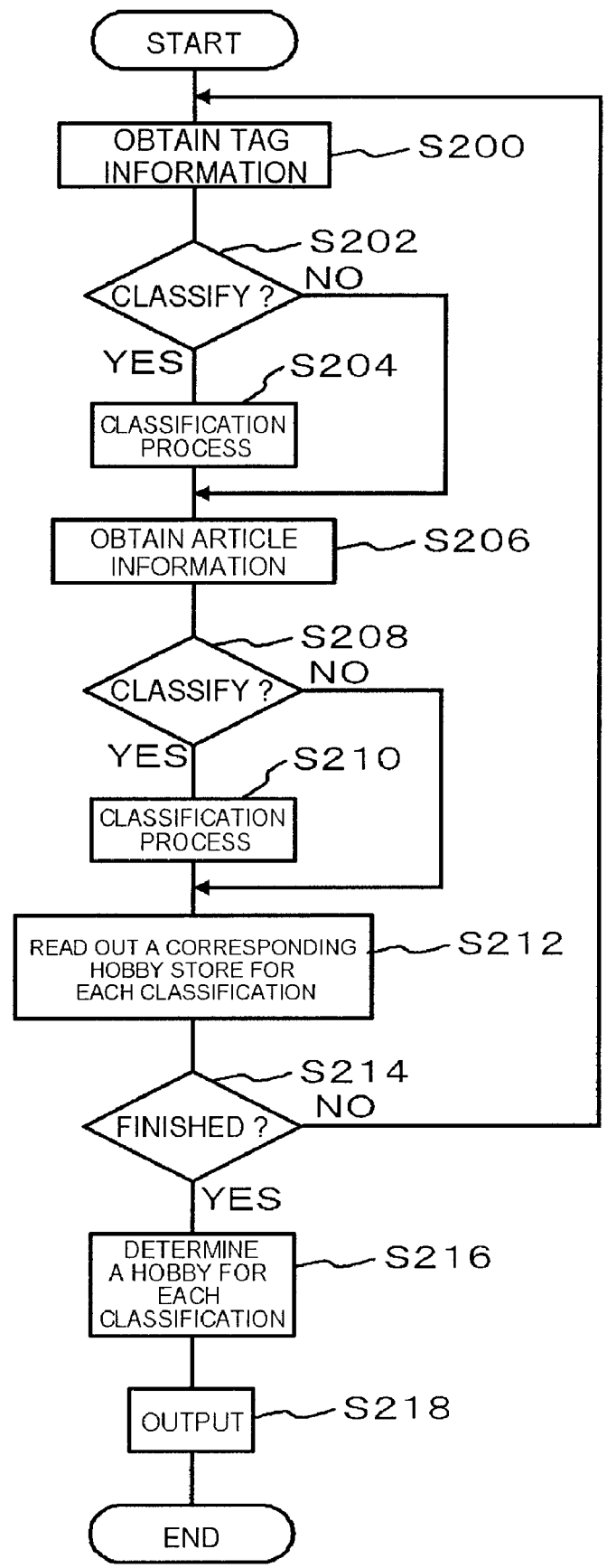
FIG. 22 is a flowchart showing one example of a processing procedure of a user preference inferring apparatus according to an embodiment of the present invention.

FIG. 22 is a flowchart showing one example of a processing procedure of the user preference inferring apparatus 100 in the present embodiment.

First, the information obtaining unit 102 obtains tag information from an IC tag 1 (step S200). Subsequently, the classification processing unit 120 determines whether or not the classification of articles is to be carried out (step S202). In the present embodiment, classification of articles means determination of the owner. The stage at which the classification processing unit 120 carries out the classification of articles may be set in advance. For example, if it is set that the classification of articles is to be carried out every time the information obtaining unit 102 obtains tag information from an IC tag 1, the classification processing unit 120 determines that the classification is to be carried out in the step S202 (YES in the step S202), and the classification process of the articles on which the information obtaining unit 102 has obtained tag information is carried out (step S204). The classification processing unit 120 stores the classification result into the classification result storing unit 122.

After the step S204 or if it is determined that the classification is not to be carried out in the step S202 (NO in the step S202), the flow proceeds to the step S206, where the article information obtaining unit 108 obtains the corresponding article information from the article information database 150 on the basis of the tag information that the information obtaining unit 102 has obtained (step S206). Here, the article information may be an article name or an article category name.

Subsequently, the classification processing unit 120 determines whether or not the classification of articles is to be carried out (step S208). For example, if it is set that the classification of articles is to be carried out every time the article information obtaining unit 108 obtains article information from the article information database 150, the classification processing unit 120 determines that the classification is to be carried out in the step S208 (YES in the step S208), and the classification process of the articles on which the article information obtaining unit 108 has obtained article information is carried out (step S210). The classification processing unit 120 stores the classification result into the classification result storing unit 122.

After the step S210 or if it is determined that the classification is not to be carried out in the step S208 (NO in the step S208), the flow proceeds to the step S212, where the preference determining unit 114 reads out a corresponding hobby from the preference information database 5 on the basis of the article information that the article information obtaining unit 108 has obtained. Here, in the present embodiment, the article information obtaining unit 108 notifies the preference determining unit 114 of the tag information obtained from the information obtaining unit 102 as well in correspondence together with the article information obtained from the article information database 150. Upon receiving the notification from the article information obtaining unit 108, the preference determining unit 114 makes reference to the preference information database 5 and reads out the hobby corresponding to the article information. Also, at the same time, the preference determining unit 114 makes reference to the classification result storing unit 122 and reads out the information indicating the owner of the article using the tag information as a key. The preference determining unit 114 stores the number of read-out times for each owner into the read-out result storing unit 19 in correspondence with the hobby that has been read out from the preference information database 5 (step S212).

Subsequently, the controlling unit (not illustrated) of the user preference inferring apparatus 100 determines whether or not the process for all the articles has been finished (step S214). If the process has not been finished yet (NO in the step S214), the flow returns to the step S200, where a similar process is repeated for the next article. On the other hand, when the process is finished in the step S214 (YES in the step S214), the preference determining unit 114 makes reference to the read-out result storing unit 19 and the threshold value storing unit 15 and, for each owner, determines whether or not the number of read-out times for each of the hobbies stored in the read-out result storing unit 19 is above or equal to the threshold value stored in the threshold value storing unit 15 (step S216). When there is a hobby above or equal to the threshold value, the hobby above or equal to the threshold value is determined as a hobby of the owner, and the determination result is output (step S218). On the other hand, when there is no hobby above or equal to the threshold value in the step S216, the preference determining unit 114 may determine that the reliability of determination is low in the step S218, and may output the fact that there is no corresponding hobby.

Figure 23:
FIG. 23 is a view showing one example of an internal structure of a classification result storing unit according to an embodiment of the present invention.

FIG. 23 is a view showing one example of an internal structure of a classification result storing unit 122 in the present embodiment. The classification result storing unit 122 includes a tag information column and an owner information column. Here, the tag information "0001" and "0003" are made to correspond to the owner information "p[0]". Also, the tag information "0002" is made to correspond to the owner information "p[1]". Namely, the articles of the tag information "0001" and "0003" are classified into a group that is specified by the owner information "p[0]". The articles of the tag information "0002" are classified into a group that is specified by the owner information "p[1]".

FIG. 24 is a view showing one example of an internal structure of a read-out result storing unit 19 in the present embodiment.

Here, with respect to the owner information "p[0]", "fishing" and "overseas traveling" are stored as a hobby, and the number of read-out times is respectively two and six. Similarly, with respect to the owner information "p[1]", "skiing" is stored as a hobby, and the number of read-out times is one. The preference determining unit 114 compares with the threshold value stored in the threshold value storing unit 15 for each classification, and determines the hobby.

In the present embodiment as well, an effect similar to those of the first embodiment and the second embodiment can be obtained. Also, according to the user preference inferring apparatus 100 of the present embodiment, even if articles of a plurality of owners are arranged within a predetermined range where the user preference inferring apparatus 100 reads tag information, the preference of each owner can be inferred by considering the owner. Also, in accordance with the needs, an inquiry on needed information may be made to the user, and a reply may be allowed to be input, so that the user's preference can be inferred with a good precision.

Sixth Embodiment

Figure 25:
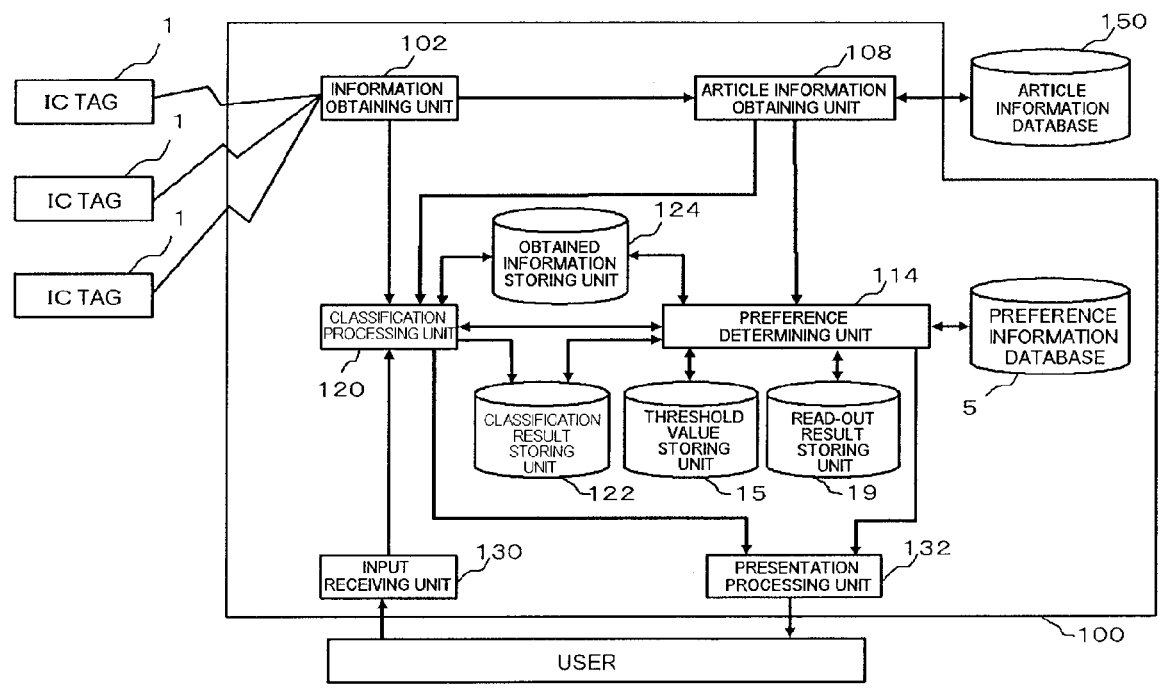
FIG. 25 is a view showing a structure of a user preference inferring apparatus according to an embodiment of the present invention.

FIG. 25 is a view showing a structure of a user preference inferring apparatus 100 in the present embodiment.

In the present embodiment, after obtaining tag information attached to a plurality of articles, the user preference inferring apparatus 100 clusters the articles and, for each cluster, determines the user's preference on the basis of the articles belonging to the cluster. After clustering the plurality of articles, the user preference inferring apparatus 100 can infer the owner for each cluster as well. This allows that errors are less likely to be generated, and the preference can be inferred with a better precision.

In the present embodiment, the user preference inferring apparatus 100 further includes an obtained information storing unit 124 in addition to the structure described with reference to FIG. 21 in the fifth embodiment. The obtained information storing unit 124 stores information related to the articles on which the information obtaining unit 102 has obtained tag information. In the present embodiment, the obtained information storing unit 124 stores, for example, the position information of the articles. The classification processing unit 120 classifies a plurality of articles by making reference to the obtained information storing unit 124.

Figure 26:
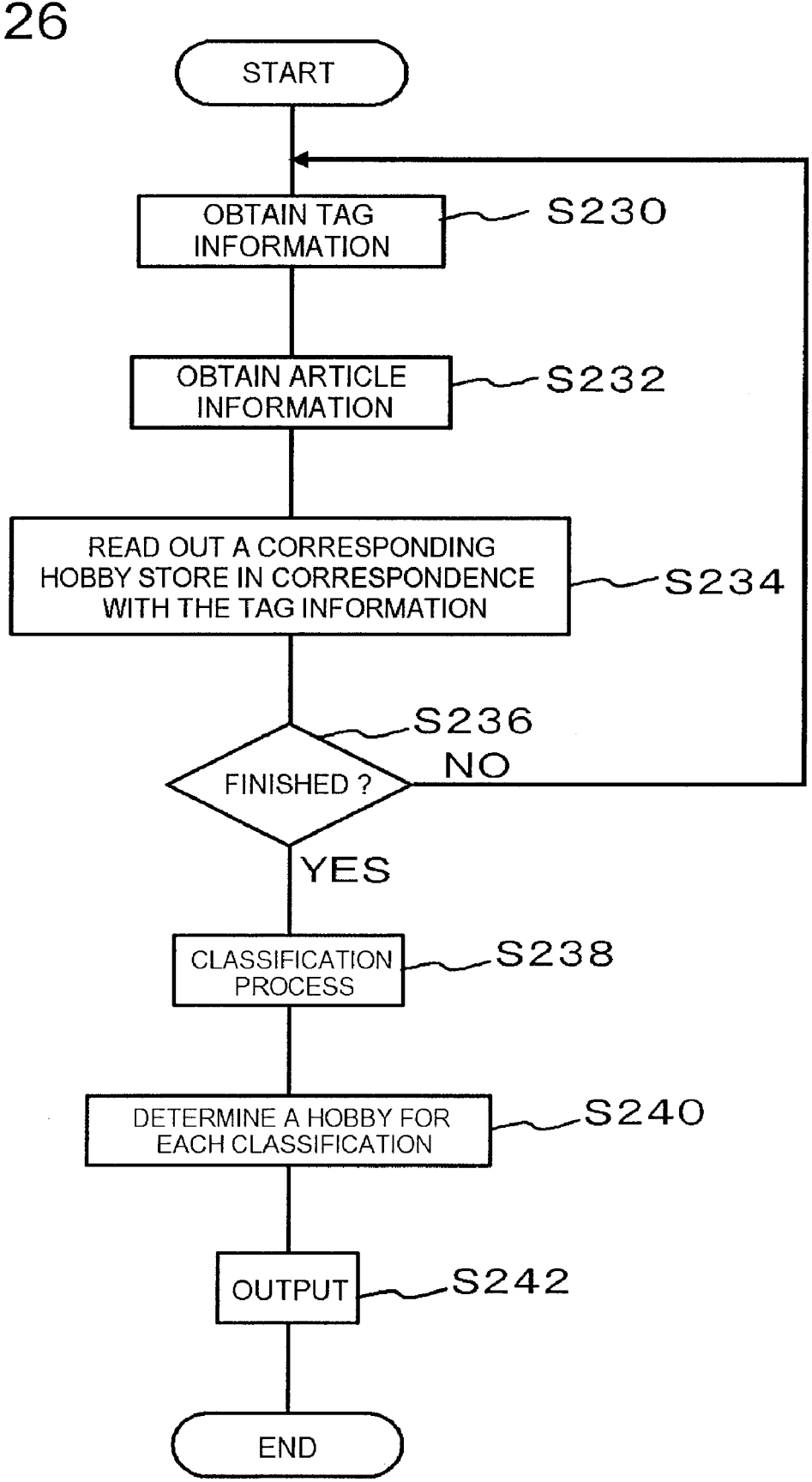
FIG. 26 is a flowchart showing one example of a processing procedure of a user preference inferring apparatus according to an embodiment of the present invention.

FIG. 26 is a flowchart showing a processing procedure of the user preference inferring apparatus 100 in the present embodiment.

First, the information obtaining unit 102 obtains tag information from an IC tag 1 (step S230). At this time, the classification processing unit 120 obtains position information of each article. The classification processing unit 120 stores the position information of each article into the obtained information storing unit 124 in correspondence with the tag information. Subsequently, the article information obtaining unit 108 obtains corresponding article information from the article information database 150 on the basis of the tag information that the information obtaining unit 102 has obtained (step S232). Subsequently, the preference determining unit 114 reads out a corresponding hobby from the preference information database 5 on the basis of the article information that the article information obtaining unit 108 has obtained. Here as well, the article information obtaining unit 108 notifies the preference determining unit 114 of the tag information obtained from the information obtaining unit 102 as well in correspondence together with the article information obtained from the article information database 150. The preference determining unit 114 stores the hobby read out from the preference information database 5 into the read-out result storing unit 19 in correspondence with the tag information (step S234).

Subsequently, the controlling unit (not illustrated) of the user preference inferring apparatus 100 determines whether or not the process for all the articles has been finished (step S236). If the process has not been finished yet (NO in the step S236), the flow returns to the step S230, where a similar process is repeated for the next article. On the other hand, when the process is finished in the step S236 (YES in the step S236), the classification processing unit 120 classifies the plurality of articles, i.e. performs a clustering process, on the basis of the position information by making reference to the obtained information storing unit 124 (step S238). Here, the classification processing unit 120 can classify the plurality of articles in the same manner as the owner determining means 9 described in the third embodiment, the clustering means 11 described in the fourth embodiment, and the classification processing unit 120 described in the fifth embodiment.

The preference determining unit 114 makes reference to the obtained information storing unit 124, the read-out result storing unit 19, and the threshold value storing unit 15 and, for each cluster, determines whether or not the number of read-out times for each of the hobbies stored in the read-out result storing unit 19 is above or equal to the threshold value stored in the threshold value storing unit 15 (step S240). When there is a hobby above or equal to the threshold value, the hobby above or equal to the threshold value is determined as a hobby for the cluster, and the determination result is output (step S242). On the other hand, when there is no hobby above or equal to the threshold value in the step S240, the preference determining unit 114 may determine that the reliability of determination is low in the step S242, and may output the fact that there is no corresponding hobby.

Here, in the present embodiment as well, the classification processing unit 120 can make an inquiry to the user on the owner of the articles via the presentation processing unit 132, and can receive a reply from the user via the input receiving unit 130. By this, the classification processing unit 120 can obtain information related to the owner of each cluster.

In the present embodiment, every time the information obtaining unit 102 obtains tag information, the classification processing unit 120 can infer the owner of the article, and can store the position information of the article and the information indicating the owner into the obtained information storing unit 124 in correspondence with the tag information, in the same manner as described in the fifth embodiment. After the process is finished for all the articles, the classification processing unit 120 can make reference to the obtained information storing unit 124, and can classify the articles in accordance with the owner. At this time, the classification processing unit 120 can change the inferred owner in accordance with the position information of the articles. This allows that the owner can be inferred with a better precision. The classification processing unit 120 stores the changed result into the classification result storing unit 122.

Also, in other examples, if the classification processing unit 120 cannot obtain the position information of the articles, for example, the classification processing unit 120 can classify the articles in accordance with the article information that the article information obtaining unit 108 has obtained. For example, the article information obtaining unit 108 can obtain information related to the target age for use of each article on the basis of the tag information that the information obtaining unit 102 has obtained. In this case, the classification processing unit 120 can classify the articles in accordance with the target age for use.

In the present embodiment as well, an effect similar to those of the first embodiment and the second embodiment will be obtained. Also, according to the user preference inferring apparatus 100 in the present embodiment, the preference can be inferred for each cluster, whereby errors are less likely to be generated, and the preference can be inferred with a better precision.

Seventh Embodiment

In the present embodiment, the user preference inferring apparatus is incorporated into a robot capable of spontaneous traveling or moving. The robot in the present embodiment has a function of performing a dialogue with the user.

With use of such a robot, the following effects can be further obtained in addition to the effects similar to those of the user preference inferring apparatus 100 in the first to sixth embodiments.

Since the robot moves spontaneously, the robot can automatically read the IC tag 1 attached to an article located within a room. Also, since the robot has a function of performing a dialogue with the user, the robot can receive instructions from the user or can obtain needed information during the dialogue with the user. This allows that the inferring function of the user preference inferring apparatus 100 can be enhanced. Further, the robot can perform a dialogue with the user with use of the inference result of the user preference inferring apparatus 100, so that a smooth communication between the robot and the user can be achieved.

Figure 27:
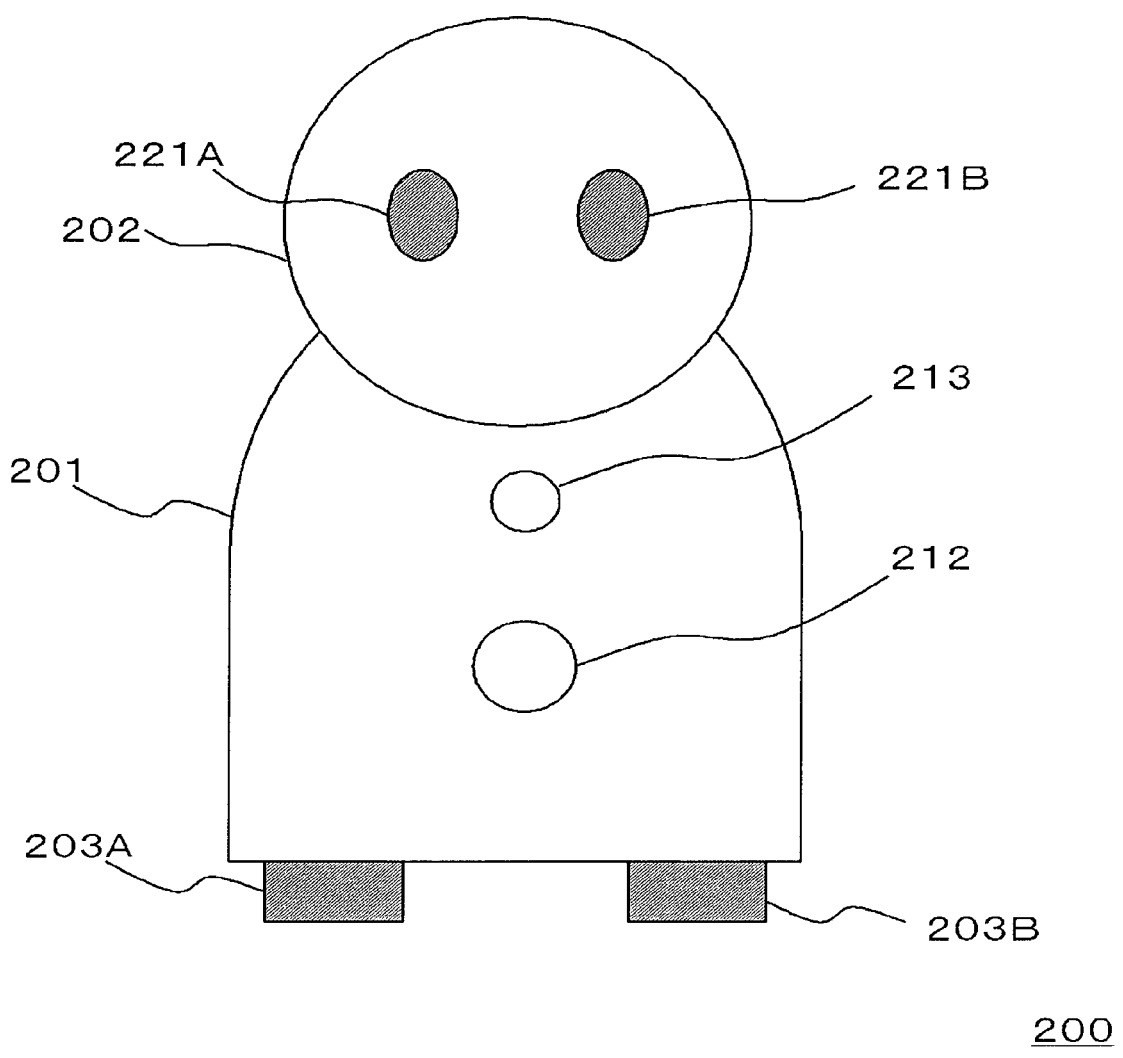
FIG. 27 is an outlook structure view showing one example of a robot according to an embodiment of the present invention.

FIG. 27 is an outlook structure view showing one example of a robot in the present embodiment.

The robot 200 is constructed, for example, by interconnecting a body part 201 and a head part 202. To the lower part of the body part 201, a wheel 203A and a wheel 203B are mounted respectively to the right and to the left, and these wheels can be independently rotated forward and backward.

The head part 202 can be rotated within a predetermined range relative to a vertical shaft vertically mounted to the body part 201 and a horizontal shaft disposed at an angle of 90° to the vertical shaft. The vertical shaft is disposed to pass through the center of the head part 202, and the horizontal shaft is disposed horizontally in the right-and-left direction so as to pass through the center of the head part 202 in a state in which the body part 201 and the head part 202 face to the front. Namely, the head part 202 can be rotated within a predetermined range with a degree of freedom of two in the right-and-left direction and in the up-and-down direction.

A speaker 212 and a microphone 213 are provided on the surface of the body part 201. Also, a CCD camera 221A and a CCD camera 221B are provided on the surface of the head part 202.

Here, the structure of the robot 200 is not limited to the structure having a body part 201 and a head part 202 shown in FIG. 27, and may have any shape.

Figure 28:
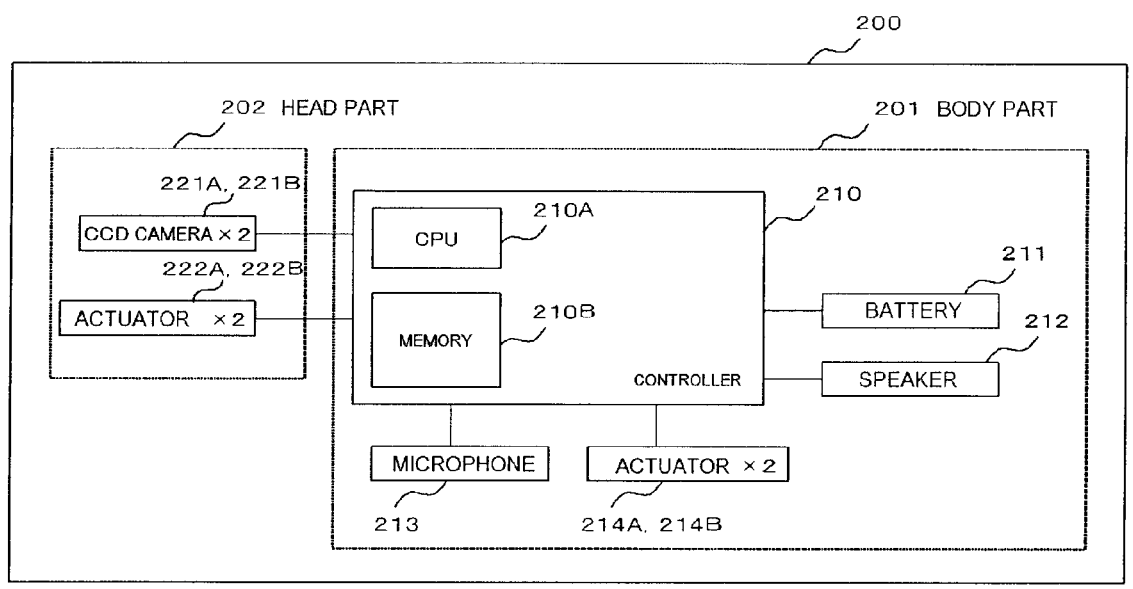
FIG. 28 is a block diagram showing one example of an electrical structure of the robot.

FIG. 28 is a block diagram showing one example of an electrical structure of the robot 200.

In the body part 201, a controller 210 performing overall control of the robot, a battery 211 serving as a motive force source of the robot, a speaker 212, a microphone 213, an actuator 214A and an actuator 214B for moving the two wheels, and the like are housed.

The microphone 213 collects voices in the surroundings, and sends the obtained voice signal to the controller 210. Also, though only one microphone 213 is illustrated here, a plurality of microphones 213 may be provided in the robot 200. By this, for example, a process of removing the noise and the like can be carried out.

The controller 210 incorporates a CPU 210A and a memory 210B, and performs various processes by execution in the CPU 210A of a controlling program stored in the memory 210B.

The head part 202 houses a CCD camera 221A and a CCD camera 221B, an actuator 222A and an actuator 222B for rotating the head part 202, and others.

The CCD camera 221A and the CCD camera 221B capture images of the circumstances of the surroundings, and send the obtained image signals to the controller 210. The actuator 222A and the actuator 222B rotate the head part 202 of the robot 200 in the right-and-left direction and in the up-and-down direction.

The controller 210 suitably reads out information from the memory 210B on the basis of the voice signals and the image signals obtained from the microphone 213, the CCD camera 221A, and the CCD camera 221B, analyzes the circumstances of the surroundings and the instructions from the user, and decides the behavior of the robot 200 and the speech of the robot 200.

Upon decision of the behavior of the robot, the controller 210 controls the actuator 214A, the actuator 214B, the actuator 222A, and the actuator 222B on the basis of the decision result thereof, and allows the head part 202 to be rotated in the right-and-left direction and in the up-and-down direction and allows a behavior such as moving or rotating the robot 200.

Upon decision of the speech of the robot, the controller 210 creates a synthesized sound on the basis of the decision result thereof, and outputs the synthesized sound through the speaker 212.

Figure 29:
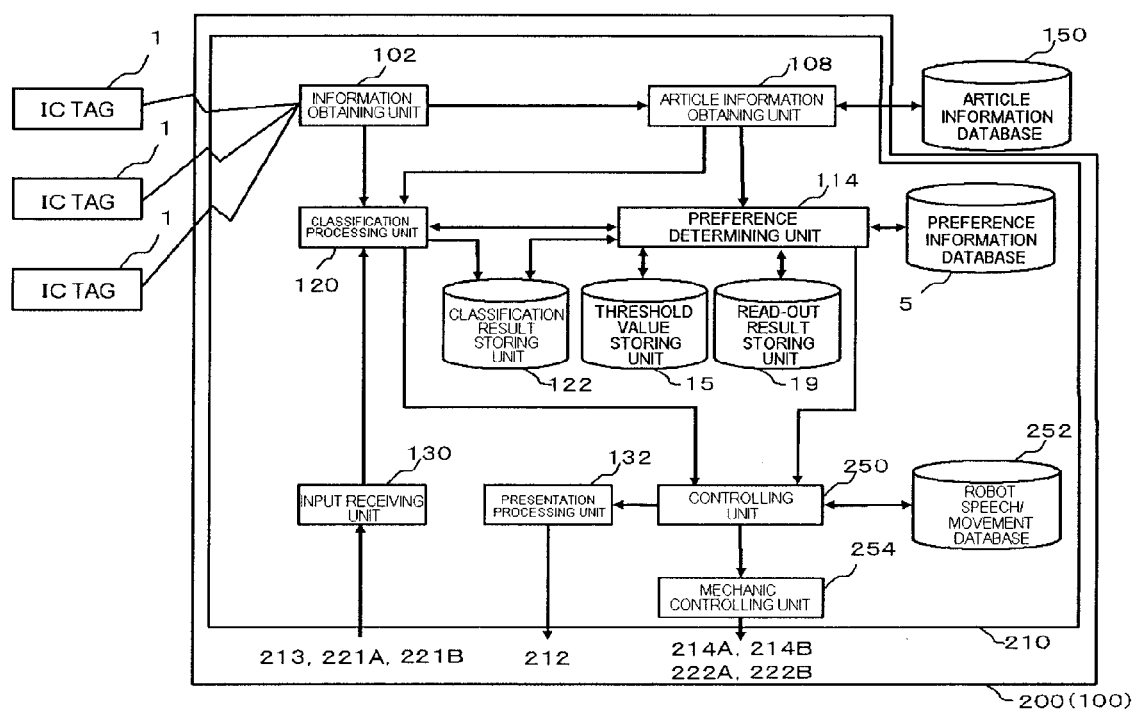
FIG. 29 is a block diagram showing in detail a controller of the robot shown in FIG. 28.

FIG. 29 is a block diagram showing in detail the controller 210 of the robot 200 shown in FIG. 28. Here, the robot 200 can have a structure having a function similar to that of the user preference inferring apparatus 100 described in the first to sixth embodiments.

The controller 210 includes an information obtaining unit 102, an article information obtaining unit 108, a classification processing unit 120, a preference determining unit 114, an input receiving unit 130, a presentation processing unit 132, a controlling unit 250, a mechanical controlling unit 254, a preference information database 5, a threshold value storing unit 15, a read-out result storing unit 19, a classification result storing unit 122, and a robot speech/behavior database 252. Although not illustrated here, the robot 200 may have a structure having an obtained information storing unit 124 in the same manner as described with reference to FIG. 25 in the sixth embodiment.

The robot speech/behavior database 252 stores speech data and behavior data of the robot in specific circumstances. The robot speech/behavior database 252 stores, for example, the correspondence table of the speech of response and the speech data corresponding to every group of words that is input by the user. For example, when the input word from the user is "Hello, I'm home", the speech of "Welcome back home" is stored as the response of the robot 200.

The input receiving unit 130 recognizes the speech/behavior of the user and the state of the surroundings on the basis of the voice signals, the image signals, and others that are sent from the microphone 213, the CCD camera 221A, and the CCD camera 221B, and notifies the controlling unit 250 of the recognition result thereof. Also, the input receiving unit 130 may be realized by a GUI (Graphical User Interface) or a button in the same manner as described in the fifth and sixth embodiments.

On the basis of the instructions for conduct that are sent from the controlling unit 250, the mechanical controlling unit 254 creates controlling signals for driving the actuator 214A, the actuator 214B, the actuator 222A, and the actuator 222B, and sends these to the actuators 214A, 214B, 222A, and 222B. The actuators 214A, 214B, 222A, and 222B are driven in accordance with the controlling signals.

The controlling unit 250 determines the conduct of the robot 200 on the basis of the recognition result of the input receiving unit 130 and the speech/behavior information stored in the robot speech/behavior database 252. In the present embodiment, the presentation processing unit 132 includes a voice synthesizing unit creating a synthesized sound, and controls the output of the synthesized sound that has been synthesized in the voice synthesizing unit.

In the present embodiment as well, the user's preference is inferred by the preference determining unit 114 according to a procedure similar to those described in the first to sixth embodiments. In the present embodiment, since the robot 200 has a function of performing a dialogue with the user, the robot can make an inquiry to the user or can obtain a reply from the user in the step of inferring the user's preference. This allows that the user's preference can be inferred efficiently and with a good precision.

Also, when the preference determining unit 114 has determined the preference of the user, the robot 200 operates in accordance with the determination result. For example, when the preference determining unit 114 has determined that the user's hobby is "listening to classic music", the controlling unit 250 makes reference to the robot speech/behavior database 252, and reads out the speech and behavior of the robot 200 that are made to correspond to the case in which the user's hobby is "listening to classic music". For example, in the robot speech/behavior database 252, the speech of "Classic music gives rest to heart, doesn't it. Please let me listen" can be set when the user's hobby is "listening to classic music". In this case, the controlling unit 250 gives instructions to the mechanical controlling unit 254, and the mechanical controlling unit 254 outputs a voice of "Classic music gives rest to heart, doesn't it. Please let me listen" from the speaker 212. By realizing such a function, for example, in a robot for home, the robot can utter a speech that accords to the user's hobby, thereby producing an effect such that the user feels more familiarity or wisdom in the robot.

According to the robot 200 in the present embodiment, the robot 200 moves spontaneously, for example, within a room, so that the robot 200 can successively read the IC tag information attached to articles located within the room. This makes it possible to make the robot 200 obtain the information of articles within a room automatically, and to determine the user's preference.

Further, since the robot 200 has a function of performing a dialogue with the user, the robot 200 can receive instructions from the user or obtain needed information during the dialogue with the user. This can achieve the convenience of the user.

Further, with use of the inference result of the user preference inferring apparatus 100, the robot can perform a dialogue with the user, so that a smooth communication between the robot and the user can be achieved.

Eighth Embodiment

Figure 30:
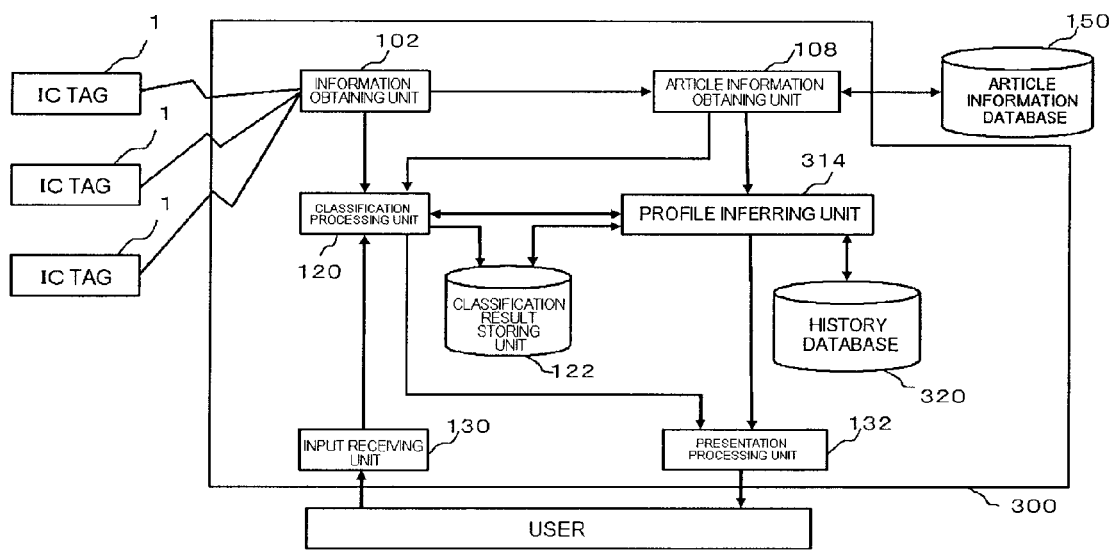
FIG. 30 is an outlook structure view showing one example of a user profile inferring apparatus according to an embodiment of the present invention.

FIG. 30 is a block diagram showing one example of a structure of a user profile inferring apparatus in the present embodiment. The user profile inferring apparatus 300 infers a profile of the user on the basis of the articles owned by the user.

The user profile inferring apparatus 300 includes an information obtaining unit 102, an article information obtaining unit 108, a classification processing unit 120, an input receiving unit 130, a presentation processing unit 132, a profile inferring unit 314, a classification result storing unit 122, and a history database 320.

The profile inferring unit 314 stores the article information obtained by the article information obtaining unit 108 into the history database 320 in correspondence with the date and time at which the article information has been obtained. Also, in the present embodiment as well, the classification processing unit 120 can classify a plurality of articles and can store the classification result into the classification result storing unit 122 in the same manner as described in the fifth and sixth embodiments. The profile inferring unit 314 can make reference to the classification result storing unit 122, and can infer the profile for each group of the articles classified by the classification processing unit 120.

In inferring the profile, the profile inferring unit 314 can make reference to the history database 320. For example, when article information and the date and time at which the article information has been obtained are stored in correspondence into the history database 320 for a certain period of time for a certain user, the profile inferring unit 314 can determine whether the user is of a type being liable to obtain a new article soon and to throw away articles or of a type using the same article for a long period of time, or the like in accordance with the change of the article information. The profile inferring unit 314 can infer the personality of the user such as "being liable to be satiated soon" or "using articles with care" in accordance with the determination result thereof.

Also, by storing the article information in correspondence with the date and time in the history database 320, one can determine how long a certain article is being owned by the user. For this reason, the list of articles owned by the user can be prepared in accordance with the date and time of obtainment. By doing so, the list can be used for determination of what product should be preferentially purchased when the user wishes to purchase a new product.

Also, in the present embodiment, even if articles of a plurality of persons are located within a room of object, the articles owned by each person can be separately controlled, so that the belongings of a family can be respectively grasped. By doing so, for example, in the case where a coat for one person is to be purchased among the family of a plurality of persons, it can be used for determination of which person's coat should be preferentially purchased.

Here, in the present embodiment as well, the user profile inferring apparatus 300 may have a structure including a preference information database 5 in the same manner as the user preference inferring apparatus 100 described in the first to seventh embodiments. In this case, the profile inferring unit 314 can determine the user's preference in the same manner as the preference determining unit 114 of the user preference inferring apparatus 100. Also, the user profile inferring apparatus 300 in the present embodiment can be incorporated into the robot 200 as well.

As described above, according to the user profile inferring apparatus 300 in the present embodiment, the user's profile such as the personality of the user and the belongings of the user can be widely inferred in addition to the preference and the hobby.

Each constituent element of the user preference inferring apparatus, the user profile inferring apparatus, and the controller of the robot described in the above embodiments can be realized by an arbitrary combination of hardware and software including mainly a CPU of any computer, a memory, a program realizing the constituent elements of the present figures loaded in the memory, a storage unit such as a hard disk storing the program, and an interface for connection to a network. Then, it will be understood to those skilled in the art that there are various modified examples for the method of realization thereof and the apparatus. Each Figure described in the embodiments shows a block for a functional unit rather than the structure of a hardware unit.

As shown above, the embodiments of the present invention have been described with reference to the drawings; however, these are examples of the present invention, so that various structures other than the above can be adopted as well.

For example, the preference determining unit 114 can determine the user's preference by presenting a plurality of preference candidates to the user after inferring the preference of the user and allowing the user to select an actual preference. By doing so, the user's preference can be determined correctly while reducing the burden of the preference of the user. Also, when the user's preference inferred by the user preference inferring apparatus 100 and the actual preference of the user are different, the difference can be fed back to be reflected on the determination process of the preference of the user from the next time on.

For example, in the first embodiment, in the step S108 shown in FIG. 5, whether or not the number of read-out times of any hobby is above or equal to the threshold value is determined, and the hobby is output (step S110) or it is output that there is no corresponding hobby (step S112) in accordance with the determination result thereof. However, in other examples, a predetermined number of hobbies may be output and presented to the user in the order from the larger number of read-out times irrespective of whether or not the hobbies are above or equal to the threshold value. At this time, a message such as "Please select your hobby" may be simultaneously presented, and the user is allowed to select any of the hobbies. When the hobby selected by the user is one that has been determined to be above or equal to the threshold value in the step S108, the inference result coincides with the actual hobby of the user. In this case, the process can be continued as it is. Also, when the user preference inferring apparatus 100 is incorporated in the robot 200, the robot 200 may be allowed to perform a dialogue with the user in accordance with the hobby selected by the user.

On the other hand, when the hobby selected by the user is one that has been determined to be not above or equal to the threshold value in the step S108 or when a hobby determined to be above or equal to the threshold value in the step S108 is not actually selected by the user as a hobby, the inference result does not coincide with the actual hobby of the user. Also, in these cases, it may be considered that the threshold value set in the threshold value storing unit 15 is not appropriate. Also, when a weight coefficient is set in the preference information database 5, it may be considered that the weight coefficient is not appropriate. The user preference inferring apparatus 100 can automatically set the threshold value of the threshold value storing unit 15 and the weight coefficient of the preference information database 5 again, or can present to the user that the inference precision is not good and prompt the user to set these again.

Also, when a hobby determined to be above or equal to the threshold value in the step S108 is not actually selected by the user as a hobby, there is a possibility that articles not owned by the user are located in the room of object, or else the inference of the owner is wrong. In this case, for example, in the seventh embodiment, the robot 200 may make an inquiry such as "Isn't the fishing rod yours ?", and may obtain a reply from the user. When the user makes a reply such as "It is not mine. A person named A has left it there" to this inquiry, it is stored in correspondence in the identification information indicating the fishing rod that the owner thereof is not the user but is the person named A. By doing so, the owner of the fishing rod can be correctly determined the next time the user's preference is inferred, so that the user's preference can be inferred with a better precision.

Also, when the user preference inferring apparatus 100 performs a process of inferring the user's preference, the user preference inferring apparatus 100 can store the result thereof in correspondence with the date and time at which the process is carried out. By doing so, change in the user's hobby can be detected the next time the user's preference is inferred. This allows that, when the user's hobby has changed, for example, a speech such as "You liked fishing before, but your hobby now is listening to classic music" can be made, thereby widening the communication with the user. Also, a plurality of changes in the user's hobby can be stored as a history. For example, when a change in the user's hobby occurs in a short period of time, the apparatus can grasp that the user has a personality of being liable to be satiated soon, and can make a dialogue of deeper contents such as "You are already satiated with fishing. You may soon be satiated with listening to classic music as well soon. You may as well refrain from buying so many new CDs."

Here, in the first to fourth embodiments, the user preference inferring apparatus 100 may have a structure further including a moving unit which is a movement unit such as wheels, legs, and crawlers. The controlling unit (not illustrated) of the user preference inferring apparatus 100 controls the moving unit. By adopting such a structure, a lot of tag information can be obtained. Also, when a plurality of articles are to be classified, the apparatus can find the position of the articles in a wider range. Moreover, when the current position of the apparatus is found by using the moving unit, the inference of the position of the articles can be made with a better precision, and the clustering can be carried out with a better precision.

In the above embodiments, a form has been shown in which, after tag information is read from an IC tag 1 attached to an article located within a range in which the receiving means 2 (or the information obtaining unit 102) can read the tag information, the preference determining means 4 (or the preference determining unit 114) performs a process of determining the preference of the user. However, for example, the receiving means 2 (or the information obtaining unit 102) may successively obtain tag information from IC tags 1 and, when the number of times read out from the preference information database 5 for a certain hobby becomes above or equal to the threshold value stored in the threshold value storing unit 15, the preference determining unit 114 may determine that the hobby is a hobby of the user, and may output the result thereof.

Here, in the above embodiments, description has been given by raising as an example a case in which the receiving means 2 or the information obtaining unit 102 obtains tag information wirelessly from an IC tag 1; however, the user preference inferring apparatus 100 may have a structure of reading the tag information not wirelessly but directly from the IC tag 1. Namely, in the first to fourth embodiments, the user preference inferring apparatus 100 may have a structure of including an information obtaining unit that reads out the tag information directly from the IC tag 1, instead of the receiving means 2. Also, in the fifth to seventh embodiments, the information obtaining unit 102 of the user preference inferring apparatus 100 may have a structure of reading out the tag information directly from the IC tag 1.

Here, the present invention includes the following modes as well.

(1) A user state inferring apparatus including a receiving means receiving information related to an article from a tag attached to said article; and a determining means inferring a user's hobby from the information of the article received by said receiving means.

(2) A user state inferring apparatus including a receiving means receiving information related to an article from a tag attached to said article; an article name determining means obtaining an article name of the article on the basis of the information related to the article that has been received by said receiving means; and a determining means determining a preference by searching into a database that stores an article name and preference information corresponding to the article name on the basis of said article name obtained from said article name determining means.

(3) A user state inferring apparatus including a receiving means receiving information related to an article from a tag attached to said article; an article name determining means obtaining an article name of the article on the basis of the information related to the article that has been received by said receiving means; an article category determining means determining a category corresponding to said article name by searching into a database that stores an article name and a category corresponding to the article name on the basis of said article name obtained from said article name determining means; and a determining means determining a preference by searching into a database that stores a category and preference information corresponding to the category on the basis of said category obtained from said article category determining means.

(4) The user state inferring apparatus as set forth in the above (2) or (3), wherein said determining means has a predetermined threshold value, and determines said preference by finding that the number of matches with said database exceeds said threshold value.

(5) The user state inferring apparatus as set forth in the above (2), wherein said determining means determines that a hobby whose sum of a weight defined for each article exceeds a threshold value is a hobby of that person.

(6) The user state inferring apparatus as set forth in the above (3), wherein said determining means determines that a hobby whose sum of a weight defined for each category exceeds a threshold value is a hobby of that person.

(7) The user state inferring apparatus as set forth in any of the above (1) to (6), wherein said determining means performs determination of a hobby for each owner of individual articles.

(8) The user state inferring apparatus as set forth in any of the above (1) to (7), including an owner inferring means inferring who is an owner for each article, wherein said determining means performs determination of a hobby for each owner of the articles.

(9) The user state inferring apparatus as set forth in any of the above (1) to (8), including a clustering means clustering, according to a certain standard, the information related to the article that has been received by said receiving means, wherein said determining means performs determination of a hobby for each cluster.

(10) The user state inferring apparatus as set forth in the above (9), wherein said clustering means clusters the information related to the article received by said receiving means in accordance with a relative positional relationship thereof, and determines the hobby for each cluster thereof.

(11) The user state inferring apparatus as set forth in any of the above (1) to (10), wherein a change in the hobby of the user is detected from a change in time of the information related to the article received by said receiving means.

(12) The user state inferring apparatus as set forth in any of the above (1) to (11), further including a moving means for self movement.

(13) A user state inferring method including receiving information related to an article from a tag attached to said article; obtaining an article name of the article on the basis of the information related to the article that has been received in said receiving; and determining a preference by searching into a database that stores an article name and preference information corresponding to the article name on the basis of said article name obtained in said obtaining.

The invention claimed is:

1. A user preference inferring apparatus comprising:
a receiving unit which receives information related to a plurality of articles from first tags attached to each of the plurality of articles and information identifying owners of each of the plurality of articles from second tags attached to each of the plurality of articles;
a preference determining unit which infers the owners of the plurality of articles and an owner's preference on the basis of the information received by said receiving unit;
a clustering processing unit which clusters, according to a predetermined standard, a plurality of said articles on which said receiving unit has received information related to said articles; and
a position information obtaining unit which obtains position information of the plurality of said articles on which said receiving unit has read out information identifying said articles,
wherein said preference determining unit infers, for each cluster divided by said clustering processing unit, the preference of the owner of the plurality of articles contained in the cluster, and
wherein said clustering processing unit clusters said articles in accordance with relative position among the articles on the basis of the position information of said articles obtained by said position information obtaining unit.

2. The user preference inferring apparatus as set forth in claim 1, further comprising an article name obtaining unit which obtains an article name of at least one of the plurality of articles on the basis of the information related to the at least one of the plurality of articles received by said receiving unit,
wherein, on the basis of the article name obtained by said article name obtaining unit, said preference determining unit obtains preference information corresponding to said article name from a database that stores the article name and the preference information corresponding to the article name.

3. The user preference inferring apparatus as set forth in claim 2, further comprising a threshold value storing unit which stores a threshold value for inferring said owner's preference,
wherein said preference determining unit infers said owner's preference on the basis of comparison between an accumulated sum of said preference information obtained from said database and said threshold value.

4. The user preference inferring apparatus as set forth in claim 3, wherein said preference determining unit obtains a weighting coefficient defined for each of the plurality of articles together with said preference information from said database, and
said preference determining unit calculates said accumulated sum considering also said weighting coefficient, and infers said owner's preference on the basis of comparison between the accumulated sum and said threshold value.

5. The user preference inferring apparatus as set forth in claim 1, further comprising:
an article name obtaining unit which obtains an article name of at least one of the plurality of articles on the basis of the information related to the at least one of the plurality of articles received by said receiving unit, and
an article category obtaining unit which obtains, on the basis of the article name obtained by said article name obtaining unit, a category corresponding to said article name from a database that stores the article name and the category corresponding to the article name,
wherein, on the basis of said category obtained by said article category obtaining unit, said preference determining unit obtains preference information corresponding to said category from a database that stores the category and the preference information corresponding to the category.

6. The user preference inferring apparatus as set forth in claim 1, further comprising:
a presentation processing unit which presents information to the user, and
an input receiving unit which receives input of information from the user,
wherein an owner inferring unit infers the owner of at least one of the plurality of articles by presenting information that inquires to said presentation processing unit on the owner and by receiving a reply to said inquiring information via said input receiving unit.

7. The user preference inferring apparatus as set forth in claim 1,
wherein the information related to the plurality of articles is information identifying said articles.

8. The user preference inferring apparatus as set forth in claim 1, further comprising:
a presentation processing unit which presents information to the user, and
an input receiving unit which receives input of information from the user,
wherein said preference determining unit determines said user's preference by allowing said presentation processing unit to present candidates of determination results and allowing said input receiving unit to receive selection of a correct determination result from among said candidates of determination results.

9. The user preference inferring apparatus as set forth in claim 1, further comprising a moving unit for moving spontaneously.

10. A robot that moves spontaneously, comprising:
a user preference inferring apparatus as set forth in claim 1;
a moving unit that moves said user preference inferring apparatus; and
an operation controlling unit controlling said moving unit.

11. A robot comprising:
a user preference inferring apparatus as set forth in claim 1; and
an operation controlling unit that operates to the user on the basis of said user's preference inferred by said user preference inferring apparatus.

12. A user profile inferring apparatus comprising:
- an information obtaining unit which obtains information related to a plurality of articles from first tags attached to each of the plurality of articles and information identifying owners of each of the plurality of articles from second tags attached to each of the plurality of articles;
- a profile inferring unit which infers the owners of the plurality of articles and an owner's profile on the basis of the information obtained by said information obtaining unit; and
- a position information obtaining unit which obtains position information of the plurality of articles on which said information obtaining unit has read out information related to the plurality of articles,
- wherein an owner inferring unit infers an owner of at least one of the plurality of articles in accordance with a relative position among articles on the basis of the position information of the plurality of articles obtained by said position information obtaining unit.

13. The user profile inferring apparatus as set forth in claim 12, further comprising a history storing unit which stores the time at which said information obtaining unit has obtained information related to at least one of the plurality of articles in correspondence with information showing the at least one of the plurality of articles,
- wherein said profile inferring unit infers said owner's profile on the basis of the information showing the at least one of the plurality of articles and the time corresponding thereto stored by said history storing unit.

14. A robot that moves spontaneously, comprising:
- a user profile inferring apparatus as set forth in claim 12;
- a moving unit that moves said user profile inferring apparatus; and
- an operation controlling unit that controls said moving unit.

15. A robot comprising:
- a user profile inferring apparatus as set forth in claim 12; and
- an operation controlling unit that operates to the user on the basis of said owner's profile inferred by said user profile inferring apparatus.

16. A user preference inferring method comprising:
- receiving information related to each article from first tags attached to a plurality of articles and information identifying owners of each of the plurality of articles from second tags attached to each of the plurality of articles; and
- inferring the owners of the plurality of articles and an owner's preference, on the basis of the information received in said receiving information
- clustering, according to a predetermined a plurality of said articles on which information related to said articles has been received; and
- obtaining, via a position information obtaining unit, position information of the plurality of said articles on which information identifying said articles has been read out,
- wherein said inferring comprises inferring, for each cluster divided by said clustering, the preference of the owner of the plurality of articles contained in the cluster, and
- wherein said clustering comprises clustering said articles in accordance with relative position among the articles on the basis of the obtained position information of said articles.

17. The user preference inferring method as set forth in claim 16, further comprising obtaining an article name of at least one of the plurality of articles on the basis of the information related to the at least one of the plurality of articles received in said receiving information related to the at least one of the plurality of articles,
- wherein, on the basis of said article name obtained in said obtaining the article name, said inferring the owner's preference includes obtaining preference information corresponding to said article name from a database that stores the article name and the preference information corresponding to the article name.

18. A user profile inferring method comprising:
- obtaining information related to a plurality of articles from first tags attached to each of the plurality of articles and information identifying owners of each of the plurality of articles from second tags attached to each of the plurality of articles;
- obtaining, via a position information obtaining unit, position information of the plurality of articles on which the information related to the plurality of articles was obtained; and
- inferring the owners of the plurality of articles and an owner's profile on the basis of the information obtained in said obtaining information,
- wherein an owner of at least one of the plurality of articles is inferred in accordance with a relative position among articles on the basis of the position information of the plurality of articles obtained by said position information obtaining unit.

* * * * *